US012311979B2

(12) United States Patent
Inoue et al.

(10) Patent No.: US 12,311,979 B2
(45) Date of Patent: May 27, 2025

(54) INFORMATION PROCESSING APPARATUS, INFORMATION PROCESSING METHOD, AND NON-TRANSITORY STORAGE MEDIUM STORING PROGRAM FOR DETERMINING A PICK-UP OR DEPOSIT POINT FOR BAGGAGE ACCORDING TO WEATHER CONDITIONS

(71) Applicant: TOYOTA JIDOSHA KABUSHIKI KAISHA, Toyota (JP)

(72) Inventors: Kazuyuki Inoue, Nagoya (JP); Yurika Tanaka, Yokosuka (JP); Satoshi Komamine, Nagoya (JP); Go Tanaka, Toyota (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 17/868,875

(22) Filed: Jul. 20, 2022

(65) Prior Publication Data
US 2023/0084979 A1 Mar. 16, 2023

(30) Foreign Application Priority Data

Sep. 16, 2021 (JP) ................. 2021-151452

(51) Int. Cl.
*B60W 60/00* (2020.01)
*B60W 40/04* (2006.01)

(52) U.S. Cl.
CPC ...... *B60W 60/00256* (2020.02); *B60W 40/04* (2013.01); *B60W 2554/4041* (2020.02); *B60W 2555/20* (2020.02)

(58) Field of Classification Search
None
See application file for complete search history.

(56) References Cited

U.S. PATENT DOCUMENTS

| 11,790,313 | B1 * | 10/2023 | Clise | G06Q 10/08355 |
| | | | | 705/338 |
| 11,900,686 | B1 * | 2/2024 | Wang | G06F 18/2431 |
| 2019/0041852 | A1 * | 2/2019 | Schubert | G06Q 10/0836 |
| 2020/0160265 | A1 * | 5/2020 | Urban | G06Q 10/0631 |
| 2020/0327472 | A1 * | 10/2020 | Anderson | G06Q 10/06315 |
| 2021/0065108 | A1 * | 3/2021 | Gabbai | G08G 5/0069 |
| 2021/0248913 | A1 * | 8/2021 | Nagai | G08G 5/045 |

FOREIGN PATENT DOCUMENTS

| DE | 102014218002 A1 * | 3/2016 | ............ G01C 21/34 |
| JP | 2020-193911 A | 12/2020 | |

* cited by examiner

*Primary Examiner* — Jelani A Smith
*Assistant Examiner* — Davin Seol
(74) *Attorney, Agent, or Firm* — Oliff PLC

(57) ABSTRACT

A controller is provided which controls a vehicle with a storage device mounted thereon in which a user is able to deposit baggage, the controller being configured to determine a deposit point of the baggage or a pick-up point of the baggage according to weather conditions.

9 Claims, 16 Drawing Sheets

| VEHICLE ID | CURRENT LOCATION | STATUS | ROUTE |
|---|---|---|---|
| V001 | × × × | × × × | × × × |
| V002 | × × × | × × × | × × × |
| V003 | × × × | × × × | × × × |
| . . . | . . . | . . . | . . . |

Fig. 5

| STOP POINT ID | LOCATION | AVAILABLE TIME |
|---|---|---|
| × × × | × × × | DAILY 10:00-12:00 |
| × × × | × × × | WEEKDAYS 8:00-17:00 |
| × × × | × × × | DAILY 24 HOURS |
| . . . | . . . | . . . |

Fig. 7

INFORMATION PROCESSING APPARATUS, INFORMATION PROCESSING METHOD, AND NON-TRANSITORY STORAGE MEDIUM STORING PROGRAM FOR DETERMINING A PICK-UP OR DEPOSIT POINT FOR BAGGAGE ACCORDING TO WEATHER CONDITIONS

CROSS REFERENCE TO THE RELATED APPLICATION

This application claims the benefit of Japanese Patent Application No. 2021-151452, filed on Sep. 16, 2021, which is hereby incorporated by reference herein in its entirety.

BACKGROUND

Technical Field

The present disclosure relates to an information processing apparatus, an information processing method, and a non-transitory storage medium storing a program.

Description of the Related Art

There has been known a technique for guiding a baggage (luggage) handling place according to weather conditions (see, for example, Patent Literature 1).

CITATION LIST

Patent Literature

Patent Literature 1: Japanese Patent Application Laid-Open Publication No. 2020-193911

SUMMARY

If a user deposits or pick-up his or her baggage when it is raining or snowing, the baggage may get wet. The object of the present disclosure is to prevent baggage from getting wet.

One aspect of the present disclosure is directed to an information processing apparatus including a controller that controls a vehicle with a storage device mounted thereon in which a user is able to deposit baggage, the controller being configured to determine a deposit point of the baggage or a pick-up point of the baggage according to weather conditions.

Another aspect of the present disclosure is directed to an information processing method for controlling, by means of a computer, a vehicle with a storage device mounted thereon in which a user is able to deposit baggage, the computer being configured to determine a deposit point of the baggage or a pick-up point of the baggage according to weather conditions.

A further aspect of the present disclosure is directed to a non-transitory storage medium storing a program for causing a computer to control a vehicle with a storage device mounted thereon in which a user is able to deposit baggage, the program being configured to cause the computer to determine a deposit point of the baggage or a pick-up point of the baggage according to weather conditions.

In addition, a still further aspect of the present disclosure is directed to the program described above.

According to the present disclosure, it is possible to prevent baggage from getting wet.

BRIEF DESCRIPTION OF THE DRAWINGS

FIG. 5 is a view illustrating an example of a table configuration of a vehicle information DB;

FIG. 7 is a view illustrating an example of a table configuration of a stop point information DB;

DESCRIPTION OF THE EMBODIMENTS

An information processing apparatus, which is one aspect of the present disclosure, includes a controller. The controller controls a vehicle with a storage device mounted thereon in which a user is able to deposit his or her baggage (luggage). The storage device, which is mounted on the vehicle, moves together with the movement or travel of the vehicle. Therefore, the user can call the storage device together with the vehicle when depositing or picking up the baggage. Therefore, the user does not have to travel a long distance when depositing or picking up the baggage.

In addition, the controller determines a deposit point of the baggage or a pick-up point of the baggage according to weather conditions. Here, in cases where it is raining, when the user deposits the baggage in the storage device or picks up the baggage therefrom, there is a concern that rain may adhere to the baggage so that the baggage may get wet. In cases where the baggage includes precision devices, electronic devices or the like, there is a concern that these devices may be damaged or malfunctioned due to rain. In addition, in the case of photographs or books, there is a concern that they may be torn or stained due to getting wet with rain. On the other hand, by determining the deposit point of the baggage or the pick-up point of the baggage according to weather conditions, it is possible to select a point at which the baggage does not get wet with rain, for example. Accordingly, it is possible to suppress the baggage from getting wet, thus making it possible to suppress the baggage from being damaged or broken.

For example, when it is raining, the controller may stop the vehicle at a place with a roof (i.e., a roofed location) so that the baggage can be deposited or picked up at the roofed location. In this case, it is sufficient that the roof covers at least a portion of the storage device where the baggage is taken in and out. Also, the roofed location may include indoors.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

Figure 1:
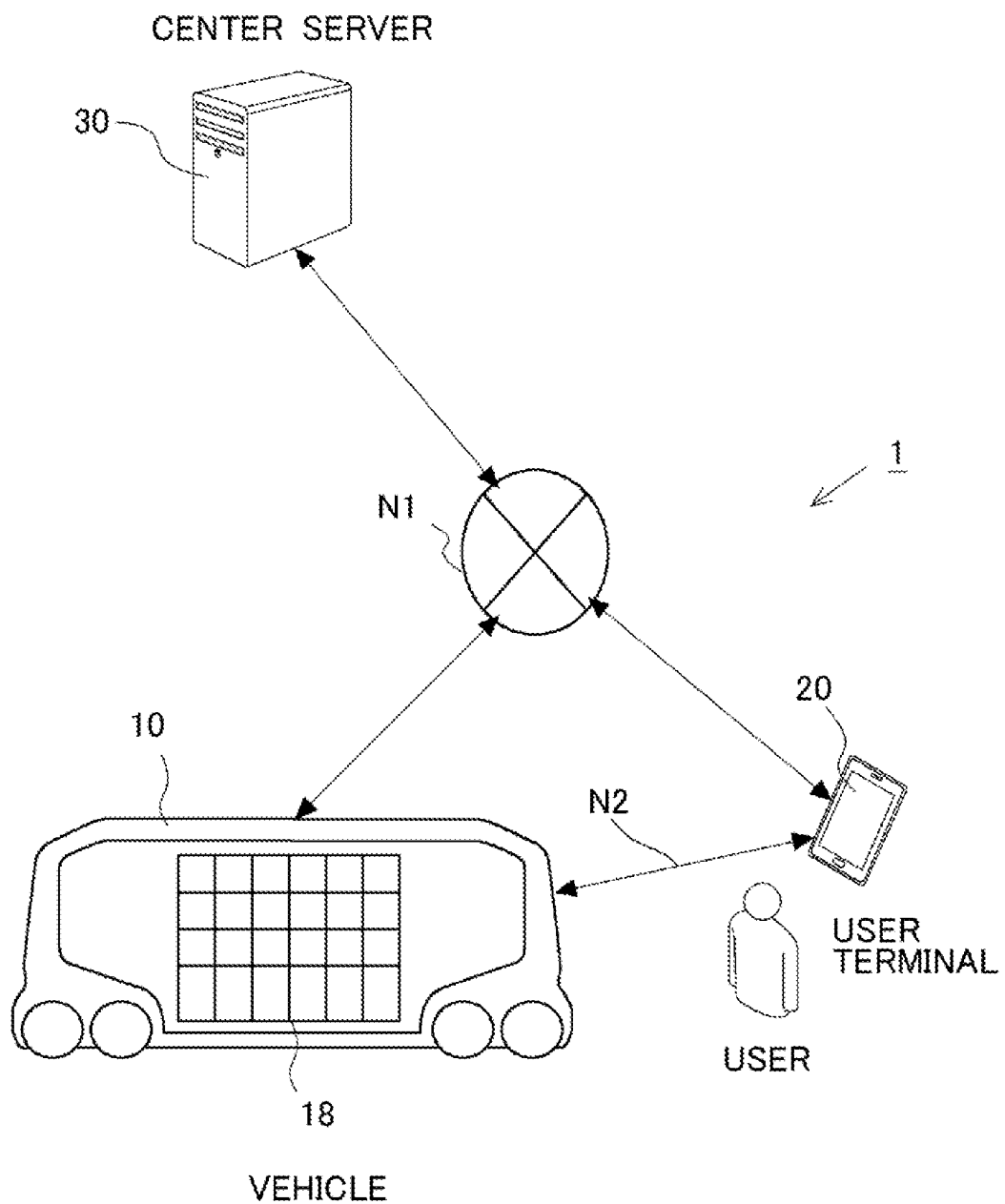
FIG. 1 is a view illustrating a schematic configuration of a system according to a first embodiment.

FIG. 1 is a view illustrating a schematic configuration of a system 1 according to a first embodiment. The system 1 is a system in which a user can store his or her baggage (luggage) or the like in a vehicle 10 with a locker 18 mounted thereon. By calling the vehicle 10 via a server 30, the user can deposit and pick up the baggage at any point. The vehicle 10 is, for example, a vehicle capable of driving autonomously, but may be a vehicle capable of being driven manually by a driver, or may be a vehicle on which a manager rides who monitors the vehicle 10 or the locker 18.

Figure 2:
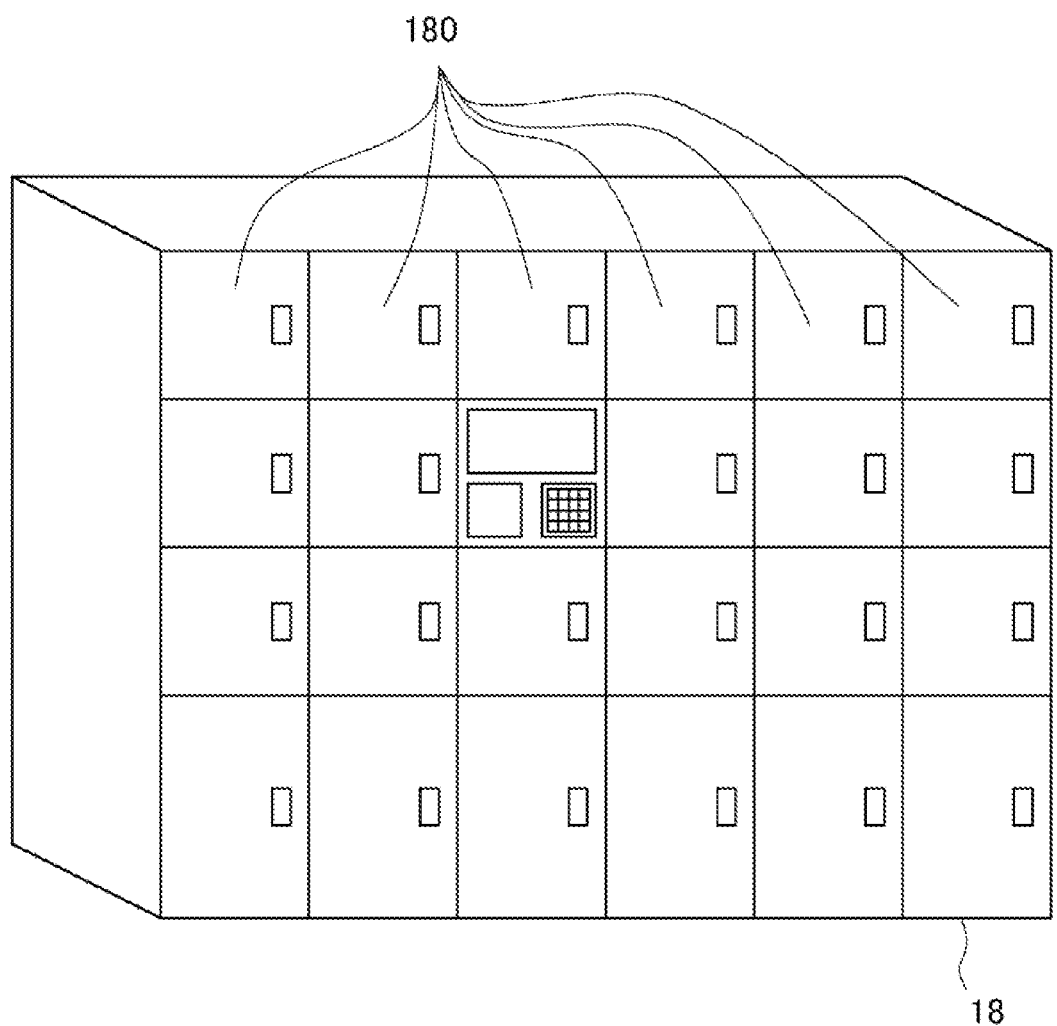
FIG. 2 is a view illustrating an appearance of a locker.

The locker 18 is a device that has a plurality of compartments (boxes), wherein baggage can be stored in each compartment. FIG. 2 illustrates the appearance of the locker 18. As illustrated, the rocker 18 is configured so that the compartments, i.e., boxes 180, can be accessed by a plurality of doors, respectively. A user of the system 1 can perform an unlocking operation of a designated box 180 by using a user terminal 20 or via an interface provided in the locker 18. The rocker 18 is mounted in a cabin of the vehicle 10. Note, that the locker 18 is an example of a storage device.

The user terminal 20 is a terminal that is carried by the user. The user can call the vehicle 10, and can lock and unlock the locker 18 by executing a predetermined application installed on the user terminal 20.

The server 30 is a device that manages the operation of vehicles 10. When receiving a dispatch request for a vehicle 10 from the user terminal 20, the server 30 determines a vehicle 10 to be dispatched to the user and instructs the vehicle 10 to operate.

The server 30 obtains weather information of a place where the vehicle 10 is dispatched, for example, from a server for managing weather information that is connected to a network N1. The server for managing weather information provides information about the weather at a predetermined point or location via the Internet, for example. The server 30 determines the stop position of the vehicle 10 so that the baggage is not affected by the weather. That is, in cases where the baggage is to be deposited or picked up in an area where it is raining, the stop position is determined so that the vehicle 10 stops at a point or location with a roof. This prevents the baggage from getting wet during deposit or pick-up of the baggage.

The vehicle 10, the user terminal 20 and the server 30 are connected to one another by means of a network N1. The network N1 is, for example, a worldwide public communication network such as the Internet or the like, and a WAN (Wide Area Network) or other communication networks may be adopted. Also, the network N1 may include a telephone communication network such as a mobile phone network or the like, or a wireless communication network such as Wi-Fi (registered trademark) or the like. In addition, the locker 18 is connected to the user terminal 20 via a network N2 including short-range wireless communication or the like. The network N2 performs data communication using, for example, Bluetooth (registered trademark) LowEnergy, NFC (Near Field Communication), UWB (Ultra Wideband), Wi-Fi (registered trademark), or the like.

Figure 3:
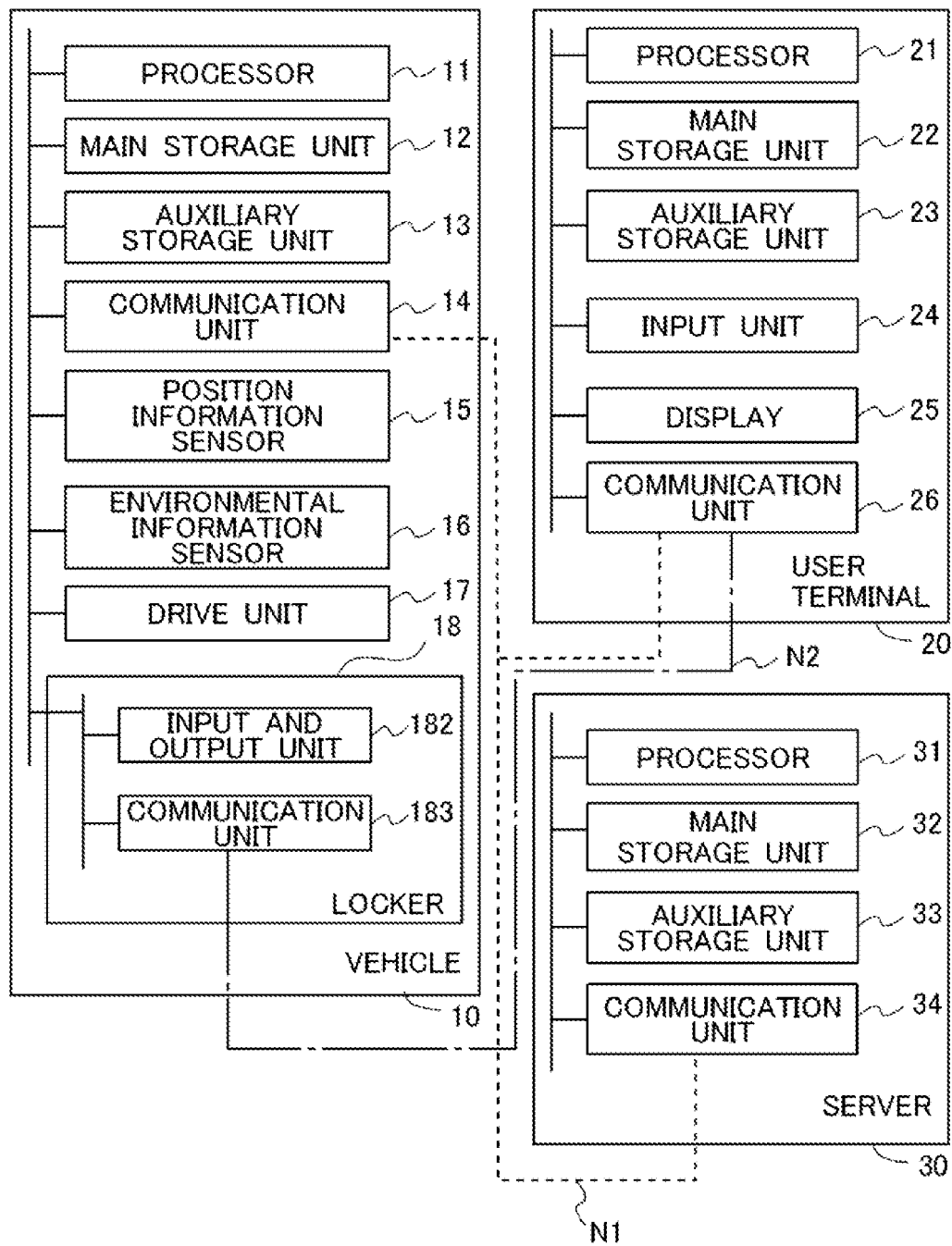
FIG. 3 is a block diagram schematically illustrating an example of a configuration of each of a vehicle, a user terminal and a server, which together constitute the system according to the embodiment.

Hardware configurations and functional configurations of the vehicle 10, the user terminal 20 and the server 30 will be described based on FIG. 3. FIG. 3 is a block diagram schematically illustrating an example of a configuration of each of the vehicle 10, the user terminal 20 and the server 30, which together constitute the system 1 according to the present embodiment.

The server 30 has a configuration of a computer. The server 30 includes a processor 31, a main storage unit 32, an auxiliary storage unit 33, and a communication unit 34. These components are connected to one another by means of a bus. The processor 31 is an example of a controller. Also, the main storage unit 32 and the auxiliary storage unit 33 are examples of a storage unit.

The processor 31 is a CPU (Central Processing Unit), a DSP (Digital Signal Processor), or the like. The processor 31 controls the server 30 thereby to perform various information processing operations. The main storage unit 32 is a RAM (Random Access Memory), a ROM (Read Only Memory), or the like. The auxiliary storage unit 33 is an EPROM (Erasable Programmable ROM), a hard disk drive (HDD), a removable medium, or the like. The auxiliary storage unit 33 stores an operating system (OS), various programs, various tables, and the like. The processor 31 loads the programs stored in the auxiliary storage unit 33 into a work area of the main storage unit 32 and executes the programs, so that each of the component units or the like is controlled through the execution of the programs. As a result, the server 30 realizes functions that match predetermined purposes. The main storage unit 32 and the auxiliary storage unit 33 are computer readable recording media. Here, note that the server 30 may be a single computer or a plurality of computers that cooperate with one another. In addition, the information stored in the auxiliary storage unit 33 may be stored in the main storage unit 32. Also, the information stored in the main storage unit 32 may be stored in the auxiliary storage unit 33.

The communication unit 34 is a means or unit that communicates with the vehicle 10 and the user terminal 20 via the network N1. The communication unit 34 is, for example, a LAN (Local Area Network) interface board, a wireless communication circuit for wireless communication, or the like. The LAN interface board or the wireless communication circuit is connected to the network N1.

Next, the vehicle 10 is, for example, a moving object that is capable of autonomously traveling, and has a computer. The vehicle 10 includes a processor 11, a main storage unit 12, an auxiliary storage unit 13, a communication unit 14, a position information sensor 15, an environmental information sensor 16, a drive unit 17, and the locker 18. These components are connected to one another by means of a bus. The processor 11, the main storage unit 12, and the auxiliary storage unit 13 are the same as the processor 31, the main storage unit 32, and the auxiliary storage unit 33 of the server 30, respectively, and hence, the description thereof will be omitted.

The communication unit 14 is a communication means or unit for connecting the vehicle 10 to the network N1. The communication unit 14 is, for example, a circuit for communicating with other devices (e.g., the server 30 and the like) via the network N1 by making use of a mobile communication service (e.g., a telephone communication network such as 5G (5th Generation), 4G (4th Generation), 3G (3rd Generation), LTE (Long Term Evolution) or the like), and/or a wireless communication such as Wi-Fi (registered trademark), Bluetooth (registered trademark) or the like.

The position information sensor 15 obtains position information (e.g., latitude and longitude) of the vehicle 10 at a predetermined cycle. The position information sensor 15 is, for example, a GPS (Global Positioning System) receiver unit, a wireless communication unit or the like. The information obtained by the position information sensor 15 is recorded, for example, in the auxiliary storage unit 13 or the like and transmitted to the server 30.

The environmental information sensor 16 is a means or unit for sensing the state of the vehicle 10 or sensing the area around the vehicle 10. As a sensor for sensing the state of the vehicle 10, there is mentioned a gyro sensor, an acceleration sensor, an azimuth sensor, or the like. Also, as a sensor for sensing the area around the vehicle 10, there is mentioned a stereo camera, a laser scanner, a LIDAR, a radar, or the like.

The drive unit 17 is a device for driving the vehicle 10 based on control commands generated by the processor 11. The drive unit 17 is configured to include, for example, a plurality of motors or the like for driving rotors provided on the vehicle 10, so that the plurality of motors or the like are driven according to the control commands to realize autonomous driving of the vehicle 10.

The locker 18 is a device that keeps the baggage (luggage) of the user. The locker 18 has a plurality of boxes 180 for storing the baggage of the user. In addition, the rocker 18 includes an input and output unit 182 and a communication unit 183. The input and output unit 182, and the communication unit 183 are connected to the processor 11 and the like in the vehicle 10 by means of a bus.

The input and output unit 182 is a unit that receives an input operation performed by a user and presents information to the user. In the present embodiment, it is composed of a single touch panel display. In addition, the input and output unit 182 may also have a further means or unit for exchanging authentication information with the user terminal 20. For example, it may have a camera or the like for reading a two-dimensional bar code.

The communication unit 183 is a communication means or unit for connecting the locker 18 to the network N2. The communication unit 183 is a circuit for communicating with another device (e.g., the user terminal 20 or the like) via the network N2 by making use of a wireless communication network such as Bluetooth (registered trademark) LowEnergy ((Near Field Communication), UWB (Ultra Wideband), Wi-Fi (registered trademark) or the like.

Now, the user terminal 20 will be described. The user terminal 20 is, for example, a smart phone, a mobile phone, a tablet terminal, a personal information terminal, a wearable computer (such as a smart watch or the like), or a small computer such as a personal computer (PC). The user terminal 20 includes a processor 21, a main storage unit 22, an auxiliary storage unit 23, an input unit 24, a display 25, and a communication unit 26. These components are connected to one another by means of a bus. The processor 21, the main storage unit 22 and the auxiliary storage unit 23 are the same as the processor 31, the main storage unit 32 and the auxiliary storage unit 33 of the server 30, respectively, and hence, the description thereof will be omitted.

The input unit 24 is a means or unit that receives an input operation performed by the user, and is, for example, a touch panel, a mouse, a keyboard, a push button, or the like. The display 25 is a means or unit for presenting information to the user, and is, for example, an LCD (Liquid Crystal Display), an EL (Electroluminescence) panel, or the like. The input unit 24 and the display 25 may be configured as a single touch panel display.

The communication unit 26 is a communication means or unit for connecting the user terminal 20 to the network N1 or the network N2. The communication unit 26 is a circuit for communicating with another device (e.g., the vehicle 10, the locker 18, the server 30, or the like) via the network N1 or the network N2 by making use of a mobile communication service (e.g., a telephone communication network such as 5G (5th Generation), 4G (4th Generation), 3G (3rd Generation), LTE (Long Term Evolution) or the like), and/or a wireless communication network such as Wi-Fi (registered trademark), Bluetooth (registered trademark) LowEnergy, NFC (Near Field Communication), UWB (Ultra Wideband) or the like.

Figure 4:
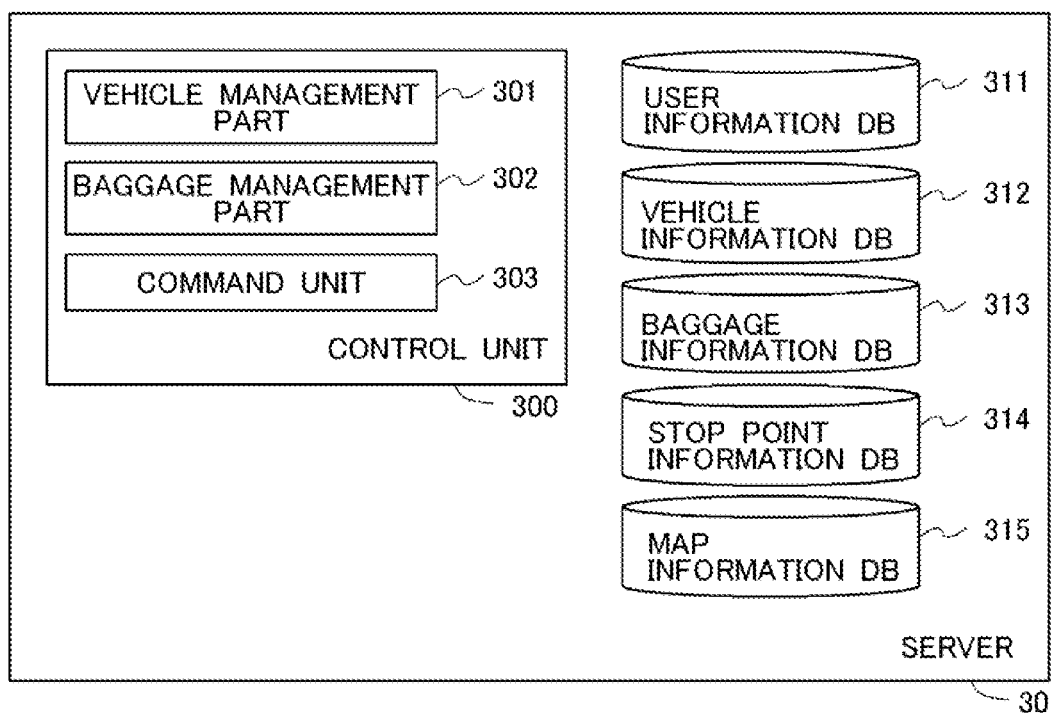
FIG. 4 is a diagram illustrating an example of a functional configuration of the server.

Now, the functions of the server 30 will be described. FIG. 4 is a diagram illustrating an example of a functional configuration of the server 30. The server 30 includes, as its functional components, a control unit 300, a user information DB 311, a vehicle information DB 312, a baggage information DB 313, a stop point information DB 314, and a map information DB 315. The processor 31 of the server 30 executes the processing of the control unit 300 by means of a computer program on the main storage unit 32. However, any of the individual functional components or a part of the processing thereof may be implemented by a hardware circuit. The control unit 300 includes a vehicle management part 301, a baggage management part 302 and a command part 303.

The user information DB 311, the vehicle information DB 312, the baggage information DB 313, the stop point information DB 314, and the map information DB 315 are built by a program of a database management system (DBMS) that is executed by the processor 31 to manage data stored in the auxiliary storage unit 33. The user information DB 311, the vehicle information DB 312, the baggage information DB 313, the stop point information DB 314, and the map information DB 315 are, for example, relational databases.

Here, note that any of the individual functional components of the server 30 or a part of the processing thereof may be executed by another or other computers connected to the network N1.

The vehicle management part 301 collects information about vehicles 10 and updates the vehicle information DB 312, which will be described later. To be specific, the vehicle management part 301 periodically communicates with a plurality of vehicles 10 and collects information about the vehicles 10 (hereinafter, also referred to as vehicle information). The information thus collected is reflected in the vehicle information DB 312 described later.

The baggage management part 302 obtains a deposit request from a user who wants to deposit his or her baggage. The deposit request is information for calling a vehicle 10 to deposit the baggage at a point desired by the user. The deposit request is transmitted from the user terminal 20 to the server 30. The deposit request includes information about a user ID, a deposit point, a deposit date and time, a baggage attribute, and the like. The user ID is an identifier unique to the user. User information (e.g., name, address, telephone number, e-mail address, etc.) corresponding to the user ID may be registered in advance by the user using the user terminal 20, or may be transmitted from the user terminal 20 together with the deposit request. This user information has been stored in the user information DB 311. The user information DB 311 is formed by storing the user information in the auxiliary storage unit 33 described above, where the user and the user information are associated with each other.

The deposit point is a point or location at which the user wants to deposit his or her baggage in the locker 18 of the vehicle 10, and is indicated, for example, by coordinates (latitude and longitude), an address, a name of a building, or the like. The deposit date and time is a date and time when the user wants to deposit the baggage in the locker of the vehicle 10. Note that the deposit date and time may be designated as a time zone having a certain range. The attribute of the baggage is information about its resistance to water, and includes, for example, information that can determine whether or not there is no problem even if the baggage gets wet with water. Also, the attribute of the baggage may include information about the baggage such as the size of the baggage.

In addition, the baggage management part 302 obtains a pick-up request from a user who wants to pick up his or her baggage. The pick-up request is information for calling the vehicle 10 carrying the baggage to a point desired by the user for the purpose of picking up the baggage. The pick-up request is transmitted from the user terminal 20 to the server 30. The pick-up request includes information about a user ID, a pick-up point, a pick-up date and time, and the like.

The pick-up point is a point or location at which the user wants to pick up his or her baggage from the locker 18 of the vehicle 10, and is indicated, for example, by coordinates (latitude and longitude), an address, a name of a building, or the like. The pick-up date and time is a date and time when the user wants to pick up the baggage from the locker 18 of the vehicle 10. Note that the pick-up date and time may be designated as a time zone with a certain range. In addition, the pick-up request may be transmitted from the user terminal 20 at the same time as the deposit request, or the pick-up request may be transmitted from the user terminal 20 after the deposit request.

The baggage management part 302 stores information included in the deposit request and information included in the pick-up request in the baggage information DB 313, which will be described later.

When receiving the deposit request or the pick-up request, the command part 303 determines a point at which the baggage is to be deposited or picked up (i.e., a point to which the vehicle 10 is to be dispatched; hereinafter, also referred to as a dispatch point) and a date and time thereof (hereinafter, also referred to as a dispatch date and time), and generates an operation command, which is a command for operating the vehicle 10. The operation command includes, for example, a route of the vehicle 10. The command part 303 generates the route based on the map information stored in the map information DB 315. For example, the command part 303 generates the operation command so that the vehicle 10 departs from the current location and travels through each dispatch point at the dispatch date and time. In addition, the operation command includes a command to keep the baggage from the user or a command to deliver the baggage to the user, at each dispatch point.

For example, when receiving the deposit request from the user, the command part 303 selects a vehicle 10 that can be dispatched (hereinafter, also referred to as a dispatchable vehicle), based on information such as the deposit location, the deposit date and time, the attribute of the baggage included in the deposit request, and the like. The dispatchable vehicle 10 is a vehicle that has a vacant box 180 in which the baggage can be deposited, and that can be moved to the deposit point at the deposit date and time.

Moreover, for example, when receiving the pick-up request from the user, the command part 303 selects a vehicle 10 to be dispatched based on the information such as the user ID, the pick-up point, the pick-up date and time, etc., included in the pick-up request. The vehicle 10 to be dispatched at this time is the vehicle for which the user has already deposited his or her baggage. Therefore, the vehicle 10 in which the user has already deposited the baggage is identified or specified based on the user ID.

Further, the command part 303 obtains the weather at the deposit point at the deposit date and time and the weather at the pick-up point at the pick-up date and time. The command part 303 connects to, for example, a Web server that provides information about the weather, and obtains the weather at the deposit point at the deposit date and time and the weather at the pick-up point at the pick-up date and time. This Web server may be a server that provides weather forecasts. Then, in cases where the weather thus obtained is rain or snow, the dispatch point of the vehicle 10 is determined such that the deposit or the pick-up of the baggage is performed at a point where there is a roof. When obtaining the information about the weather, the command part 303 stores the information in the baggage information DB 313.

For example, among points with a roof, the point closest to the deposit point included in the deposit request is determined as the dispatch point of the vehicle 10. Similarly, for example, among the points with a roof, the point closest to the pick-up point included in the pick-up request is determined as the dispatch point of the vehicle 10. Note that, as an alternative, any point which is included within a predetermined distance from the deposit point included in the deposit request or the pick-up point included in the pick-up request, and which has a roof, may be determined as the dispatch point of the vehicle 10. Further, as another alternative, a point selected by the user from among points with a roof may be determined as the dispatch point of the vehicle 10. In addition, the user may be inquired as to whether or not he or she wants to deposit or pick up his or her baggage at a point with a roof, and only when the user responds that he or she wants to do so, the deposit or delivery of the baggage at a point with a roof may be carried out.

The points with a roof have been stored in the stop point information DB 314. The points with a roof may be stored in the server 30 by the manager of the server 30. As an alternative, information about the points with a roof may be obtained from the user terminal 20. The points with a roof are each represented by, for example, coordinates, an address, or a name of a building. In addition, the points with a roof may be points that can be used according to time. For example, in a bus or taxi stop (stand), it may be usable at a time other than bus or taxi operating hours. Also, in cases where the roof of a store or the like is used, it may be used at a time other than business hours of the store. Such available time is also entered into the stop point information DB 314.

Next, the configuration of the vehicle information stored in the vehicle information DB 312 will be described based on FIG. 5. FIG. 5 is a view illustrating an example of a table configuration of the vehicle information DB 312. A vehicle information table has fields for vehicle ID, current location, status and route. In the vehicle ID field, information that can identify each vehicle (vehicle ID) is entered. A vehicle ID is assigned to each vehicle, for example, by the vehicle management part 301. In the current location field, information about the current position or location of each vehicle 10 (position information) is entered. The current location of each vehicle 10 is detected by the position information sensor 15 of the vehicle 10, and transmitted to the server 30.

In the status field, data representing the current state of each vehicle 10 is entered. Specifically, information about the remaining battery capacity of each vehicle 10 or the distance that each vehicle can travel is stored. In the route field, information about the route of each vehicle 10 is entered. The route of each vehicle 10 is generated by the command part 303.

Figure 6:
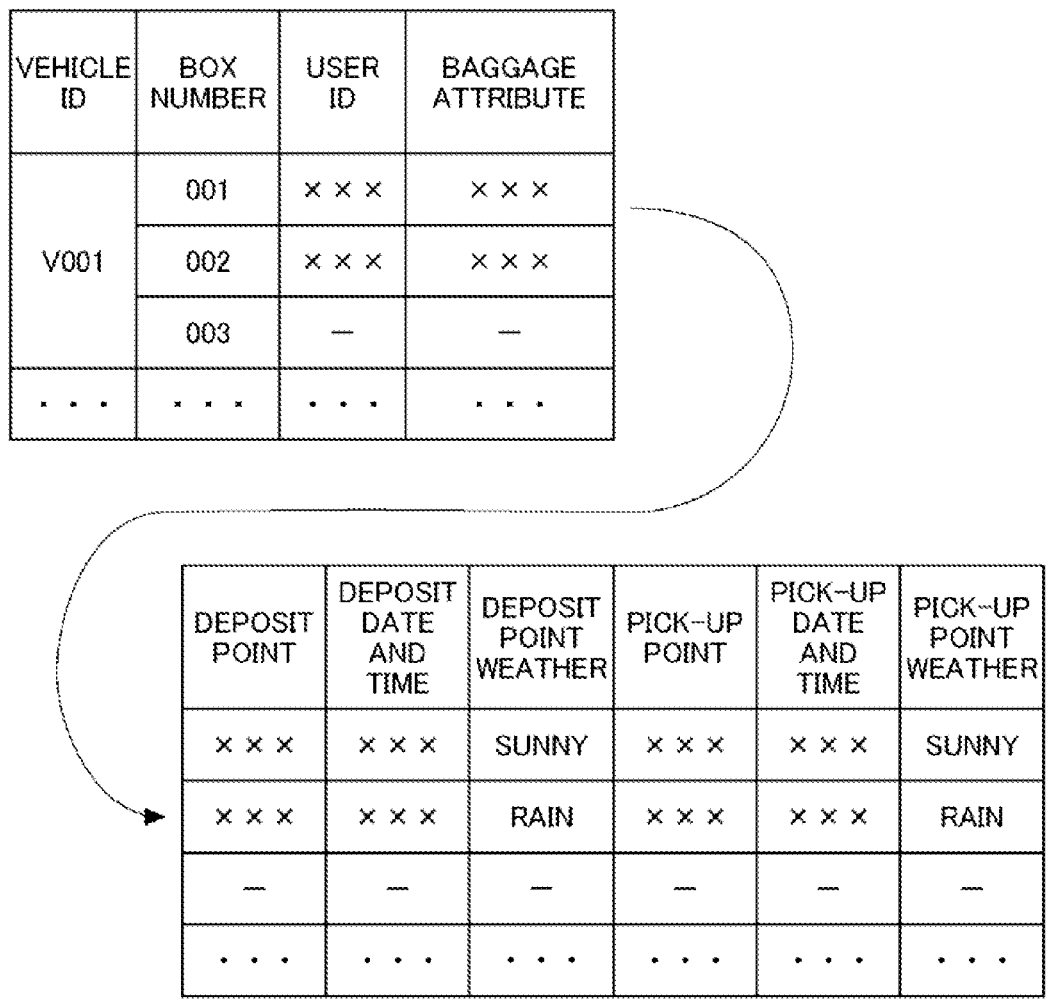
FIG. 6 is a view illustrating an example of a table configuration of a baggage information DB according to the first embodiment.

Next, the configuration of baggage information stored in the baggage information DB 313 will be described based on FIG. 6. FIG. 6 is a view illustrating an example of a table configuration of the baggage information DB 313 according to the first embodiment. The baggage information table has fields for vehicle ID, box number, user ID, baggage attribute, deposit point, deposit date and time, deposit point weather, pick-up point, pick-up date and time, and pick-up point weather. In the vehicle ID field, information that can identify each vehicle (vehicle ID) is entered. In the box number field, information that can identify each box 180 (box number) is entered. In the user ID field, information that can identify each user (user ID) is entered. In the baggage attribute field, information about the attribute of the baggage is entered. As the attribute of the baggage, for example, information that can determine whether or not there is no problem even if the baggage gets wet with water is entered. For example, precision equipment or electrical equipment is classified as such.

In the deposit point field, information about a point where each user will deposit his or her baggage is entered. In the deposit point field, information is entered about a point that can be the destination of the vehicle 10 when the user deposits the baggage in the locker 18 of the vehicle 10, for example, coordinates, an address, a name of a building or the like. In the deposit date and time field, information about the date and time when the user deposits the baggage is entered. In the deposit point weather field, information about the weather at a point where each user will deposit his or her baggage is entered. Here, for example, information that can determine whether or not it is raining or snowing may be entered.

In the pick-up point field, information about a point where the user will pick up the baggage is entered. In the pick-up point field, information is entered about a point that can be the destination of the vehicle 10 when the user picks up the baggage from the locker 18 of the vehicle 10, for example, coordinates, an address, a name of a building or the like. In the pick-up date and time field, information about a date and time at which the user will pick up the baggage is entered. In the pick-up point weather field, information about the weather at a point where the user will pick up the baggage is entered. Here, for example, information that can determine whether or not it is raining or snowing may be entered.

Next, the configuration of the stop point information stored in the vehicle information DB 314 will be described based on FIG. 7. FIG. 7 is a view illustrating an example of a table configuration of the stop point information DB 314. A stop point information table has fields for stop point ID, location, and available time. In the stop point ID field, information (stop point ID) that can identify a point (place) with a roof where the vehicle 10 can stop is entered. In the location field, information about the location of a point with a roof where the vehicle 10 can stop is entered. This location is represented, for example, by coordinates, an address, or a name of a building. In the available time field, a time (an amount of time) in which each point can be used is entered. The information stored in the stop point information DB 314 is entered by, for example, the manager of the server 30.

The map information DB 315 stores, as map information, for example, link data about roads (links), node data about node points, intersection data about each intersection, search data to search routes, facility data about facilities, search data to search points, etc. In addition, it may also store information about a speed limit or the like corresponding to each road or information about an attribute of each road.

Figure 8:
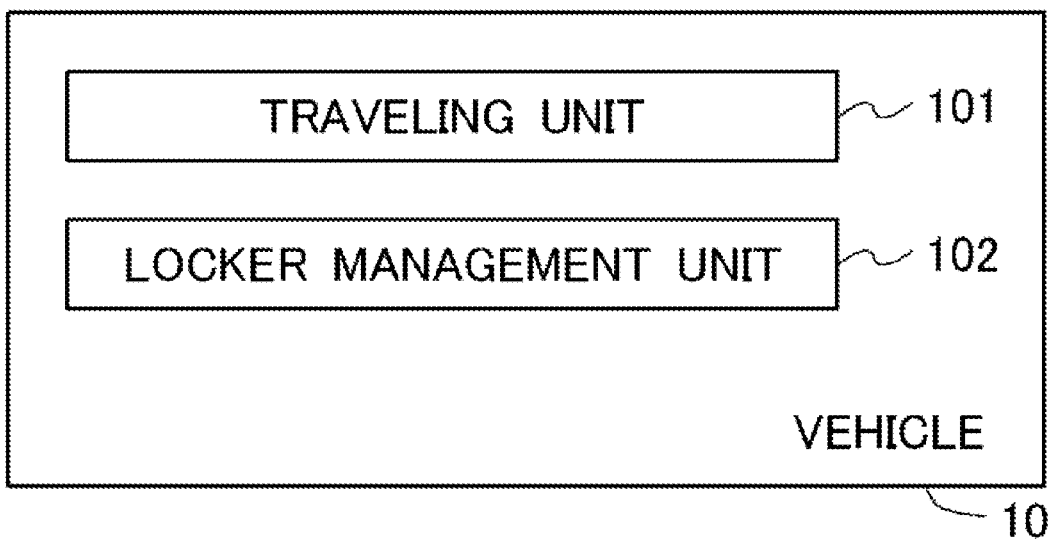
FIG. 8 is a diagram illustrating a functional configuration of the vehicle.

Now, the functions of the vehicle 10 will be described. FIG. 8 is a view illustrating a functional configuration of the vehicle 10. The vehicle 10 includes, as its functional components, a traveling unit 101 and a locker management unit 102. The processor 11 of the vehicle 10 executes the processing of the traveling unit 101 and the locker management unit 102 by a computer program on the main storage unit 12. However, any of the individual functional components or a part of the processing thereof may be implemented by a hardware circuit. Here, note that any of the individual functional components of the vehicle 10 or a part of the processing thereof may be executed by another or other computers connected to the network N1.

The traveling unit 101 controls traveling of the vehicle 10 during autonomous traveling of the vehicle 10. The traveling unit 101 generates control commands for controlling the drive unit 17 by using the data detected by the environmental information sensor 16. The traveling unit 101 controls, for example, the speed, the steering angle, and the like of the vehicle 10 by controlling a plurality of motors to generate a difference in the rotational speed of a plurality of rotors.

For example, the traveling unit 101 generates a travel trajectory of the vehicle 10 based on the data detected by the environmental information sensor 16, and controls the drive unit 17 so that the vehicle 10 travels along the travel trajectory. Here, note that as a method of causing the vehicle 10 to travel in an autonomous manner, there can be adopted a known method. The traveling unit 101 may perform feedback control based on the detection value of the environmental information sensor 16 during autonomous traveling. The traveling unit 101 controls the drive unit 17 so that the vehicle 10 autonomously travels around a predetermined route. This route is included in the operation command transmitted from the server 30.

For example, the traveling unit 101 causes the vehicle 10 to travel based on the travel route and the destination included in the operation command received from the server 30. Then, the vehicle 10 is stopped at the dispatch point for the user to deposit or pick up the baggage.

In addition, the traveling unit 101 periodically transmits information about the vehicle 10 to the server 30. The traveling unit 101 transmits information about the current location obtained by the position information sensor 15 and the remaining battery capacity to the server 30 as information about the vehicle 10.

In addition, the locker management unit 102 performs authentication of the user terminal 20 of the user who deposits or picks up the baggage, locking and unlocking of the box 180, and the like. The locker management unit 102 obtains the authentication information of the user terminal 20 from the server 30 via the network N1. Moreover, the locker management unit 102 establishes communication with the user terminal 20 via the network N2 to authenticate the user terminal 20. For example, when the authentication information obtained from the server 30 matches the authentication information obtained from the user terminal 20, the authentication of the user terminal 20 is successful.

When the authentication of the user terminal 20 is successful, the locker management unit 102 unlocks the box 180 and opens the door thereof. Thereafter, when the user closes the door of the box 180, the box 180 is locked, and the server 30 is notified that the user has deposited the baggage. As an alternative, the user may be authenticated according to the information entered into the input and output unit 182 by the user. For example, when a password entered into the input and output unit 182 by the user matches a password obtained from the server 30, the authentication is successful. This password may be determined by the server 30. Alternatively, the password entered into the user terminal 20 by the user may be transmitted from the user terminal 20 to the server 30.

Similarly, in the case of picking up the baggage, the locker management unit 102 obtains the authentication information of the user terminal 20 from the server 30 via the network N1. Moreover, the locker management unit 102 establishes communication with the user terminal 20 via the network N2 to authenticate the user. For example, when the authentication information obtained from the server 30 matches the authentication information obtained from the user terminal 20, the authentication of the user is successful. When the authentication of the user is successful, the box 180 in which the user deposited the baggage is unlocked to open the door thereof. The box number of the box in which the user deposited the baggage may be obtained from the server 30. Alternatively, when the user deposits the baggage, the box number of the box in which the user has deposited the baggage may be stored in the auxiliary storage unit 13 of the vehicle 10.

Figure 9:
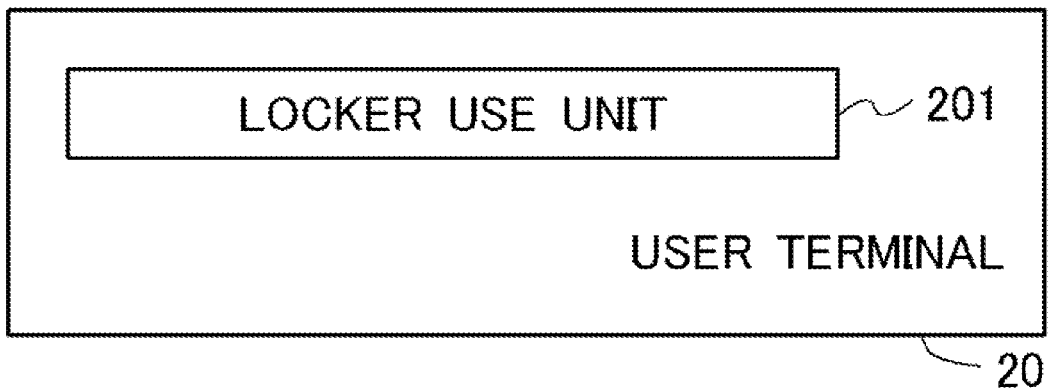
FIG. 9 is a diagram illustrating a functional configuration of the user terminal.

Next, the functions of the user terminal 20 will be described. FIG. 9 is a diagram illustrating a functional configuration of the user terminal 20. The user terminal 20 has a locker use unit 201 as its functional component. The processor 21 of the user terminal 20 executes the processing of the locker use unit 201 by a computer program on the main storage unit 22. However, a part of the processing of the locker use unit 201 may be executed by a hardware circuit. Note that a part of the processing of the locker use unit 201 may be executed by another computer connected to the network N1.

The locker use unit 201 generates a deposit request and a pick-up request according to an input to the input unit 24 of the user terminal 20. The locker use unit 201 displays a screen for using the locker 18 on the display 25. There, for example, a button is displayed together with words "DEPOSIT" and "PICK-UP".

When the user taps the "DEPOSIT" button, the locker use unit 201 prompts the user to enter user information. Note that once the user information is entered, the information may be stored in the auxiliary storage unit 23, so that the user can then use the locker 18 only by entering a password, for example. The user enters or inputs a deposit point, a deposit date and time, an address, a name, a phone number, an e-mail address, and the like through the input unit 24. Upon completion of the user's input, the locker use unit 201 generates a deposit request and transmits it to the server 30 via the network N1.

On the other hand, when the user taps the "PICK-UP" button, the locker use unit 201 prompts the user to enter or input a pick-up point, a pick-up date and time, and the like.

When the user completes these inputs via the input unit 24, the locker use unit 201 generates a pick-up request and transmits it to the server 30 via the network N1.

When the deposit request and the pick-up request are transmitted, information about the deposit or pick-up of the baggage may be transmitted from the server 30. For example, information indicating that the baggage can be deposited or picked up under the condition transmitted by the user terminal 20 or information indicating that the baggage cannot be deposited or picked up under the condition transmitted by the user terminal 20 is transmitted from the server 30. The locker use unit 201 displays a screen corresponding to the information on the display 25.

In addition, when the user deposits the baggage into the locker 18 or when the user picks up the baggage from the locker 18, the locker use unit 201 establishes communication with the communication unit 26 of the locker 18 and transmits information about the user to the locker 18. Therefore, the user terminal 20 is used as a key for unlocking the box 180 of the locker 18.

Figure 10:
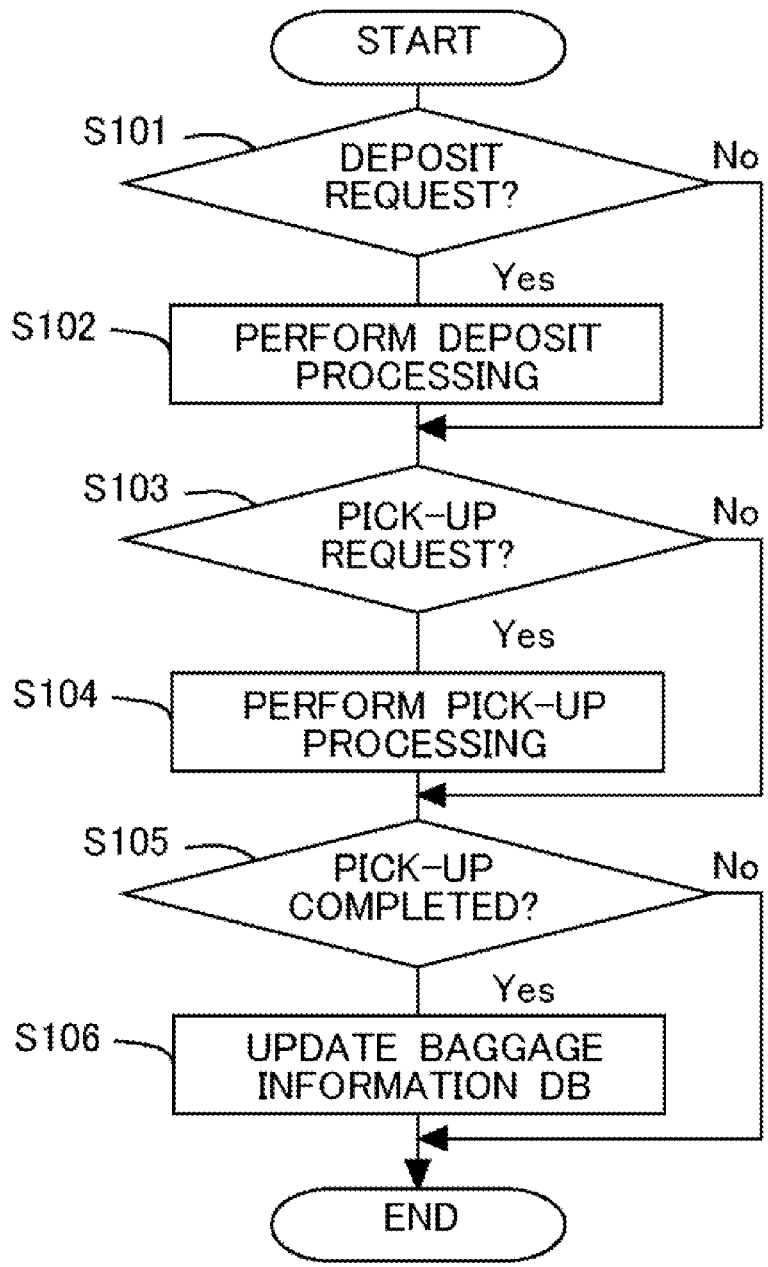
FIG. 10 is a flowchart of baggage deposit and pick-up processing in the server according to the embodiment.

Then, baggage deposit processing in the server 30 will be described. FIG. 10 is a flowchart of the baggage deposit and pick-up processing in the server 30 according to the present embodiment. The processing illustrated in FIG. 10 is executed at predetermined time intervals in the server 30. Note that the following description will be made on the assumption that the user information has been stored in advance in the user information DB 311.

In step S101, the baggage management part 302 determines whether or not a deposit request has been received from the user terminal 20. When an affirmative determination is made in step S101, the processing proceeds to step S102, whereas when a negative determination is made, the processing proceeds to step S103. In step S102, deposit processing is performed. The deposit processing will be described later.

In step S103, the baggage management part 302 determines whether or not a pick-up request has been received from the user terminal 20. When an affirmative determination is made in step S103, the processing proceeds to step S104, whereas when a negative determination is made, the processing proceeds to step S105. In step S104, pick-up processing is performed. The pick-up processing will be described later.

In step S105, the baggage management part 302 determines whether or not the pick-up of the baggage is completed. For example, when the pick-up of the baggage is completed, information including the vehicle ID, the box number, and the user ID is transmitted from the vehicle 10 to the server 30. Upon receipt of this information, the baggage management part 302 determines that the pick-up of the baggage is completed. When an affirmative determination is made in step S105, the processing or routine proceeds to step S106, whereas when a negative determination is made, this routine is ended. In step S106, the baggage management part 302 updates the baggage information DB 313. That is, the information about the user ID, baggage attribute, deposit point, deposit date and time, deposit point weather, pick-up point, pick-up date and time, and pick-up point weather corresponding to the vehicle ID and the box number is reset.

Figure 11:
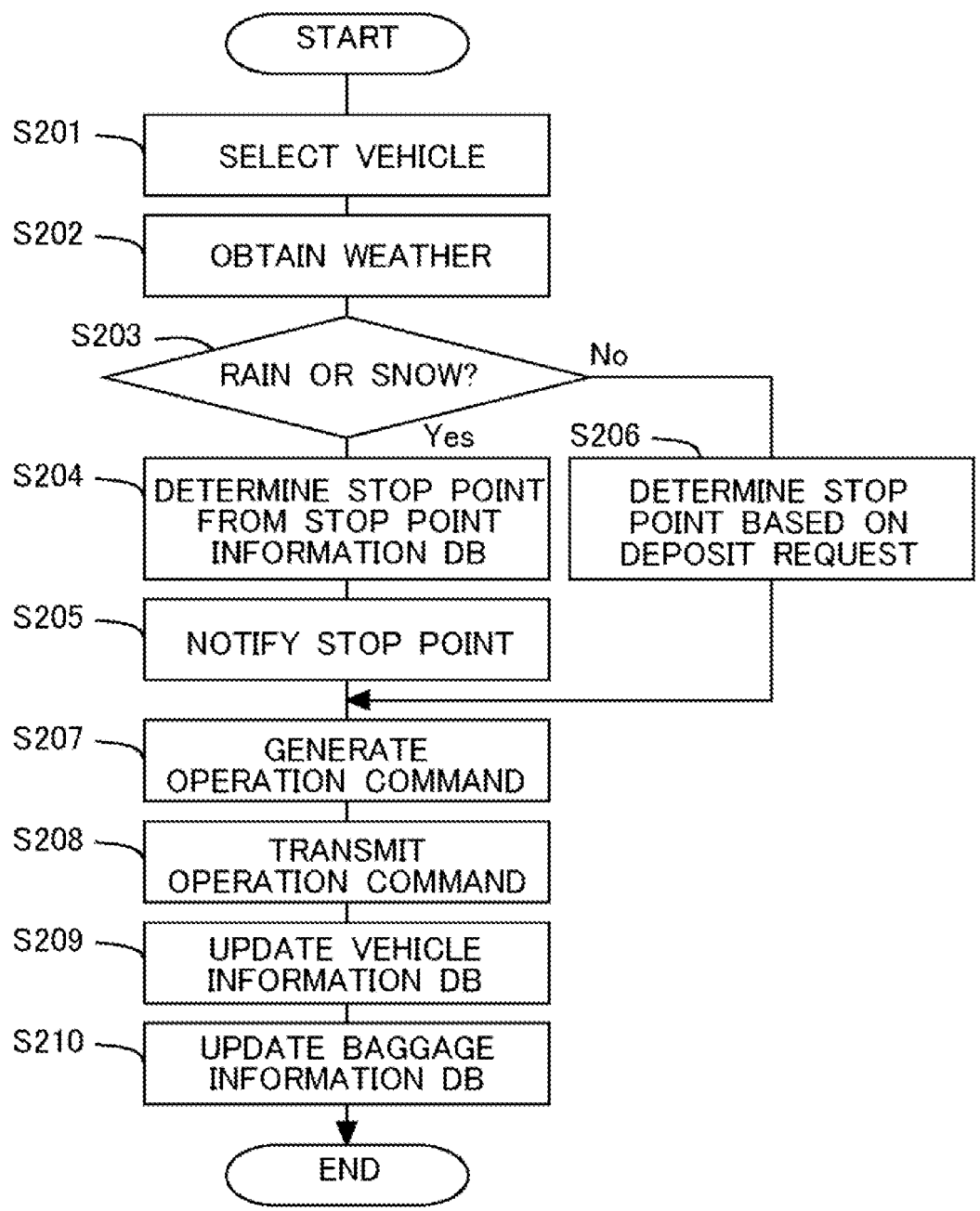
FIG. 11 is a flowchart of deposit processing according to the first embodiment.

Next, the deposit processing executed in step S102 of FIG. 10 will be described. FIG. 11 is a flowchart of the deposit processing according to the first embodiment. In step S201, the baggage management part 302 selects a vehicle 10 into which the baggage of the user is deposited. Based on the information included in the deposit request and the information stored in the baggage information DB 313, the baggage management part 302 selects a vehicle 10 that is able to move to the deposit point at the deposit date and time and that has one or more vacant (available) boxes 180. At this time, a box 180 for depositing the baggage is also selected.

In step S202, the baggage management part 302 obtains the weather at the deposit point at the deposit date and time. The baggage management part 302 obtains information about the weather by accessing the server that provides the information about the weather.

In step S203, the baggage management part 302 determines whether or not the weather obtained in step S202 is rain or snow. In this step, it is determined whether or not there is a possibility that the baggage gets wet. When an affirmative determination is made in step S203, the processing proceeds to step S204, whereas when a negative determination is made, the processing proceeds to step S206.

In step S204, the command part 303 determines a stop point based on the information stored in the stop point information DB 314. The command part 303 extracts a point with a roof closest to the deposit point based on the deposit point included in the deposit request and the location stored in the location field of the stop point information DB 314, and determines this point as a point where the vehicle 10 stops (i.e., a dispatch point). At this time, the command part 303 determines a stop point whose deposit date and time is included in the available time stored in the stop point information DB 314 as the point where the vehicle 10 stops.

Then, in step S205, the command part 303 notifies the user terminal 20 of the stop point thus determined. For example, if the deposit point entered by the user is far from the stop point, the user may not be able to reach the vehicle 10, and thus the stop point of the vehicle 10 is notified to the user. By this notification, for example, a map showing the stop point of the vehicle 10 may be displayed on the display 25 of the user terminal 20.

On the other hand, in step S206, the command part 303 determines the deposit point included in the deposit request as the stop point of the vehicle 10. Note that, in this case, too, as in step S205, the stop point thus determined may be notified to the user terminal 20.

In step S207, the command part 303 generates an operation command so that the vehicle 10 departs from the current location and travels via the stop point at the deposit date and time. The operation command includes, for example, a route of the vehicle 10. In addition, the command part 303 generates the operation command so that the user terminal 20 is authenticated at the stop point to keep the baggage from the user. Then, in step S208, the command part 303 transmits the operation command to the vehicle 10. Further, in step S209, the command part 303 updates the vehicle information DB 312. That is, the route generated in step S207 is entered in the route field.

In step S210, the baggage management part 302 updates the baggage information DB 313. That is, the baggage information DB 313 is updated by entering information about each of the user ID, the baggage attribute, the deposit point, the deposit date and time, and the weather at the deposit point into the baggage information DB 313.

Figure 12:
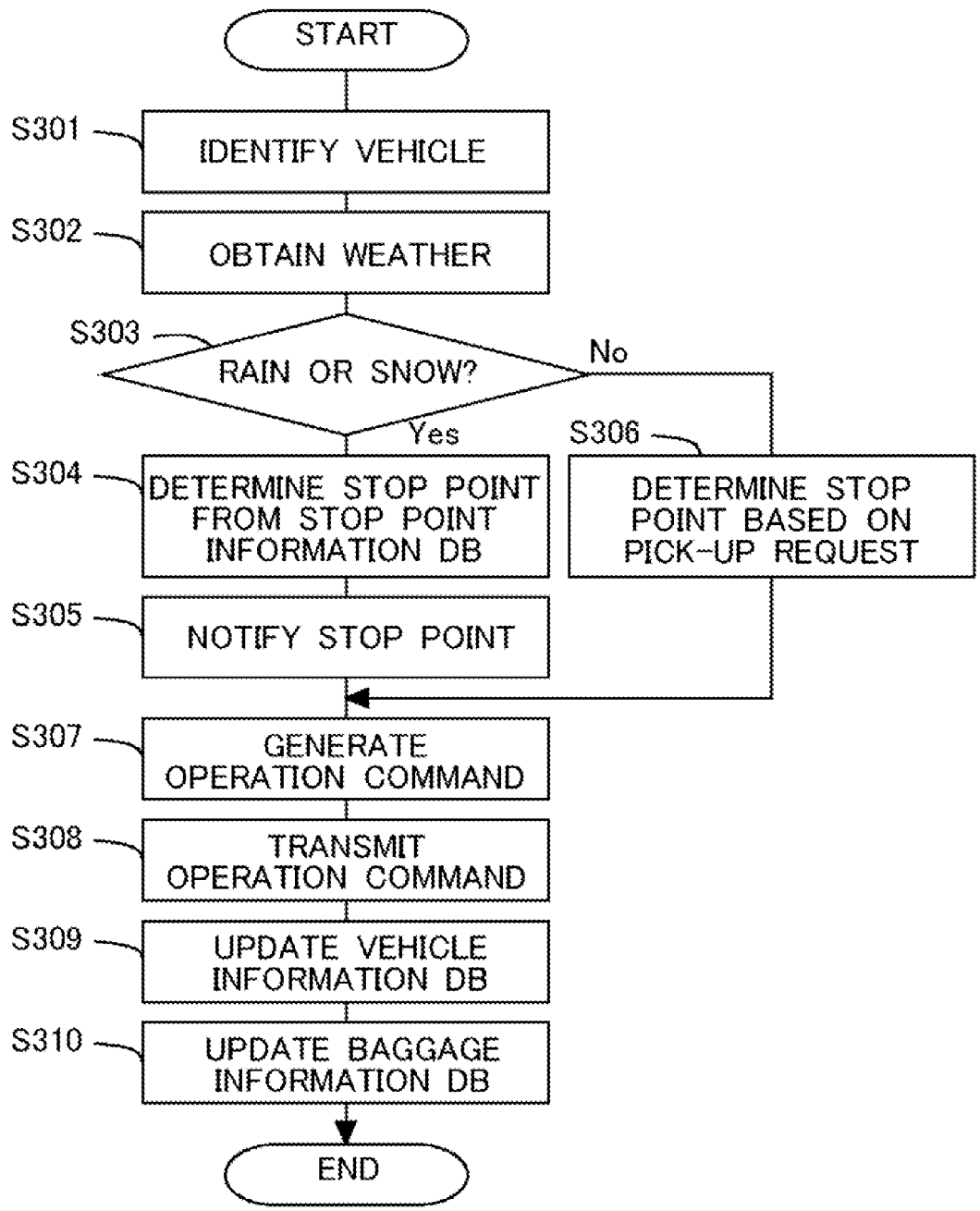
FIG. 12 is a flowchart of pick-up processing according to the first embodiment.

Next, the deposit processing executed in step S104 of FIG. 10 will be described. FIG. 12 is a flowchart of the pick-up processing according to the first embodiment. In step S301, the baggage management part 302 identifies the vehicle 10 in which the baggage of the user has been deposited. The baggage management part 302 identifies the vehicle 10 in which the baggage with the matching user ID is deposited, based on the information included in the pick-up request and the information stored in the baggage information DB 313.

In step S302, baggage management part 302 obtains the weather at the pick-up point at the pick-up date and time. The baggage management part 302 obtains information about the weather by accessing the server that provides the information about the weather.

In step S303, the baggage management part 302 determines whether or not the weather obtained is rain or snow. In this step, it is determined whether or not there is a possibility that the baggage gets wet. When an affirmative determination is made in step S303, the processing proceeds to step S304, whereas when a negative determination is made, the processing proceeds to step S306.

In step S304, the command part 303 determines a stop point based on the information stored in the stop point information DB 314. The command part 303 extracts a point with a roof closest to the pick-up point based on the pick-up point included in the pick-up request and the location stored in the location field of the stop point information DB 314, and determines this point as a point where the vehicle 10 stops (i.e., a dispatch point). At this time, the command part 303 determines a stop point whose pick-up date and time is included in the available time stored in the stop point information DB 314 as the point where the vehicle 10 stops.

Then, in step S305, the command part 303 notifies the user terminal 20 of the stop point thus determined. For example, if the pick-up point entered by the user is far from the stop point, the user may not be able to reach the vehicle 10, and thus the stop point of the vehicle 10 is notified to the user. By this notification, for example, a map showing the stop point of the vehicle 10 may be displayed on the display 25 of the user terminal 20.

On the other hand, in step S306, the command part 303 determines the pick-up point included in the pick-up request as the stop point of the vehicle 10. Note that, in this case, too, as in step S305, the stop point thus determined may be notified to the user terminal 20.

In step S307, the command part 303 generates an operation command so that the vehicle 10 departs from the current location and travels via the stop point at the pick-up date and time. The operation command includes, for example, a route of the vehicle 10. In addition, the command part 303 generates the operation command so that the user terminal 20 is authenticated at the stop point to deliver the baggage to the user. Then, in step S308, the command part 303 transmits the operation command to the vehicle 10. Further, in step S309, the command part 303 updates the vehicle information DB 312. That is, the route generated in step S307 is entered in the route field.

In step S310, the baggage management part 302 updates the baggage information DB 313. That is, the baggage information DB 313 is updated by entering the information about the user ID, the pick-up point, the pick-up date and time, and the weather at the pick-up point into the baggage information DB 313.

As described above, according to the first embodiment, in cases where there is a possibility that baggage gets wet with rain or snow at the time of deposit or pick-up of the baggage, the vehicle 10 stops at a place with a roof, thus making it possible to suppress the baggage from getting wet.

Second Embodiment

Figure 13:
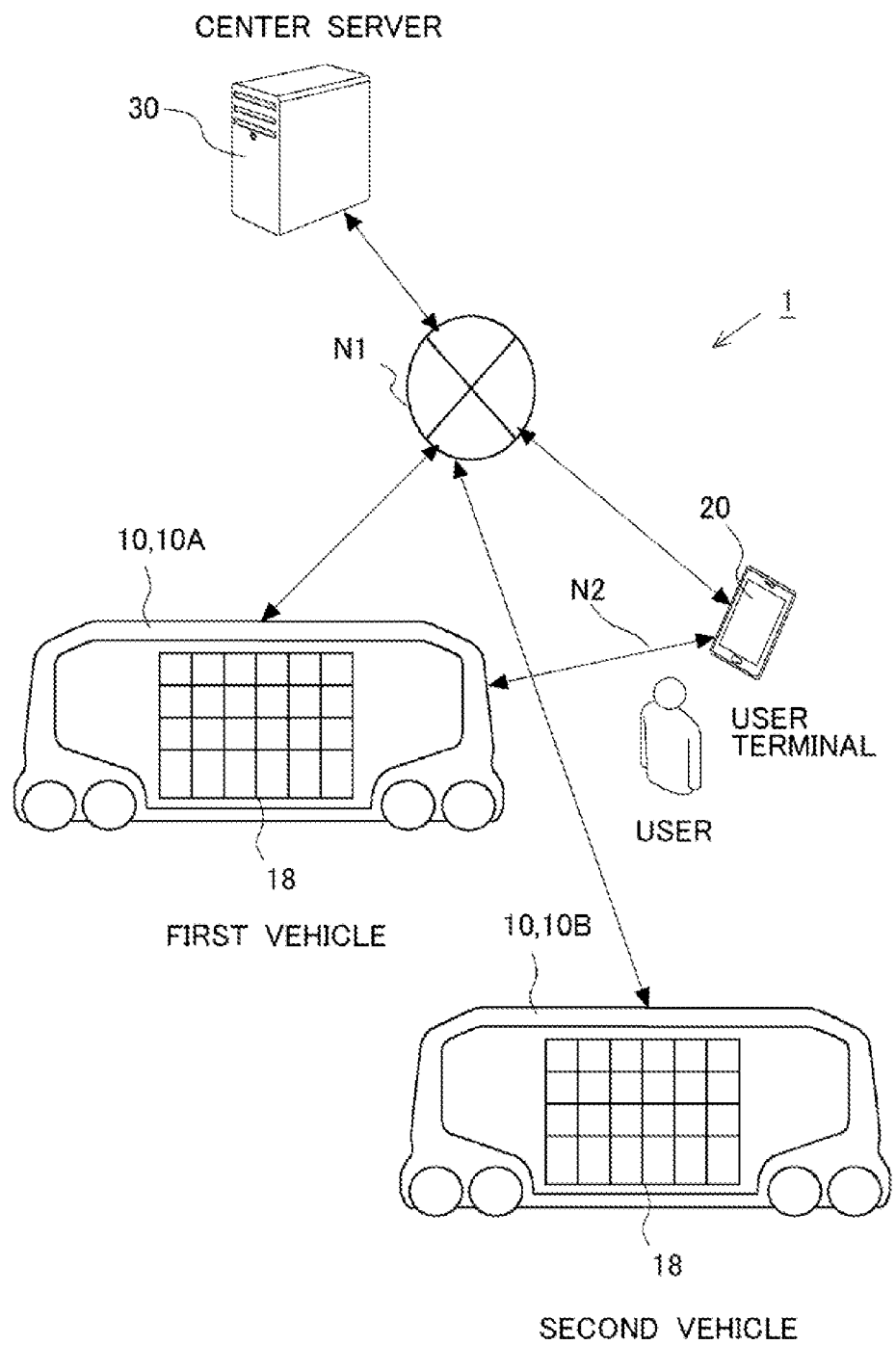
FIG. 13 is a view illustrating a schematic configuration of a system according to a second embodiment.

In a second embodiment, priority is set for baggage so that the baggage can be received at a point with a roof according to the priority. FIG. 13 is a view illustrating a schematic configuration of a system 1 according to the second embodiment. The second embodiment includes a first vehicle 10A and a second vehicle 10B as vehicles 10. In the following, in cases where the first vehicle 10A and the second vehicle 10B are not distinguished from each other, they are simply referred to as vehicles 10.

Here, for example, if two vehicles 10 stop at the same point at the same time, it is possible that either one of the vehicles 10 may not be able to stop under the roof. In such a case, priority is given to the deposit or pick-up of high priority baggage. For example, the more likely an item is to fail or be damaged when gets wet with water, the higher is the priority thereof. For example, in cases where the baggage deposited in the first vehicle 10A is electronic equipment and the baggage deposited in the second vehicle 10B is fresh food, the electronic equipment has a higher priority. Therefore, an operation command is generated so that the first vehicle 10A with the electronic equipment deposited therein stops at a point with a roof. On the other hand, the point where the second vehicle 10B stops may be, for example, a point desired by the user or a point relatively close to a point with a roof. The point relatively close to the point with a roof may be, for example, a point where the two vehicles 10 are spaced apart from each other so that they can parallel park.

Figure 14:
FIG. 14 is a view illustrating an example of a table configuration of a baggage information DB according to the second embodiment.

FIG. 14 is a view illustrating an example of a table configuration of the baggage information DB 313 according to the second embodiment. A baggage information table has fields for vehicle ID, box number, user ID, baggage attribute, deposit point, deposit date and time, deposit point weather, pick-up point, pick-up date and time, and pick-up point weather. Since the parts other than the priority field are the same as the table configuration illustrated in FIG. 6, the explanation of the parts other than the priority field will be omitted.

In the priority field, a priority to avoid getting wet with water is entered. The priority is classified into five levels, for example, and indicated by a number from 1 to 5. For example, the larger the value, the higher the priority. The priority may be determined based on the baggage attribute by the baggage management part 302, for example, or may be optionally determined by the user. When the user decides, the priority is entered by the user on the user terminal 20 and transmitted to the server 30 along with a deposit request or a pick-up request. In addition, the relationship between the baggage attribute and the priority may have been stored in advance in the auxiliary storage unit 33. For example, the more likely the baggage is to fail or be damaged when gets wet with water, the higher is the priority thereof.

Figure 15:
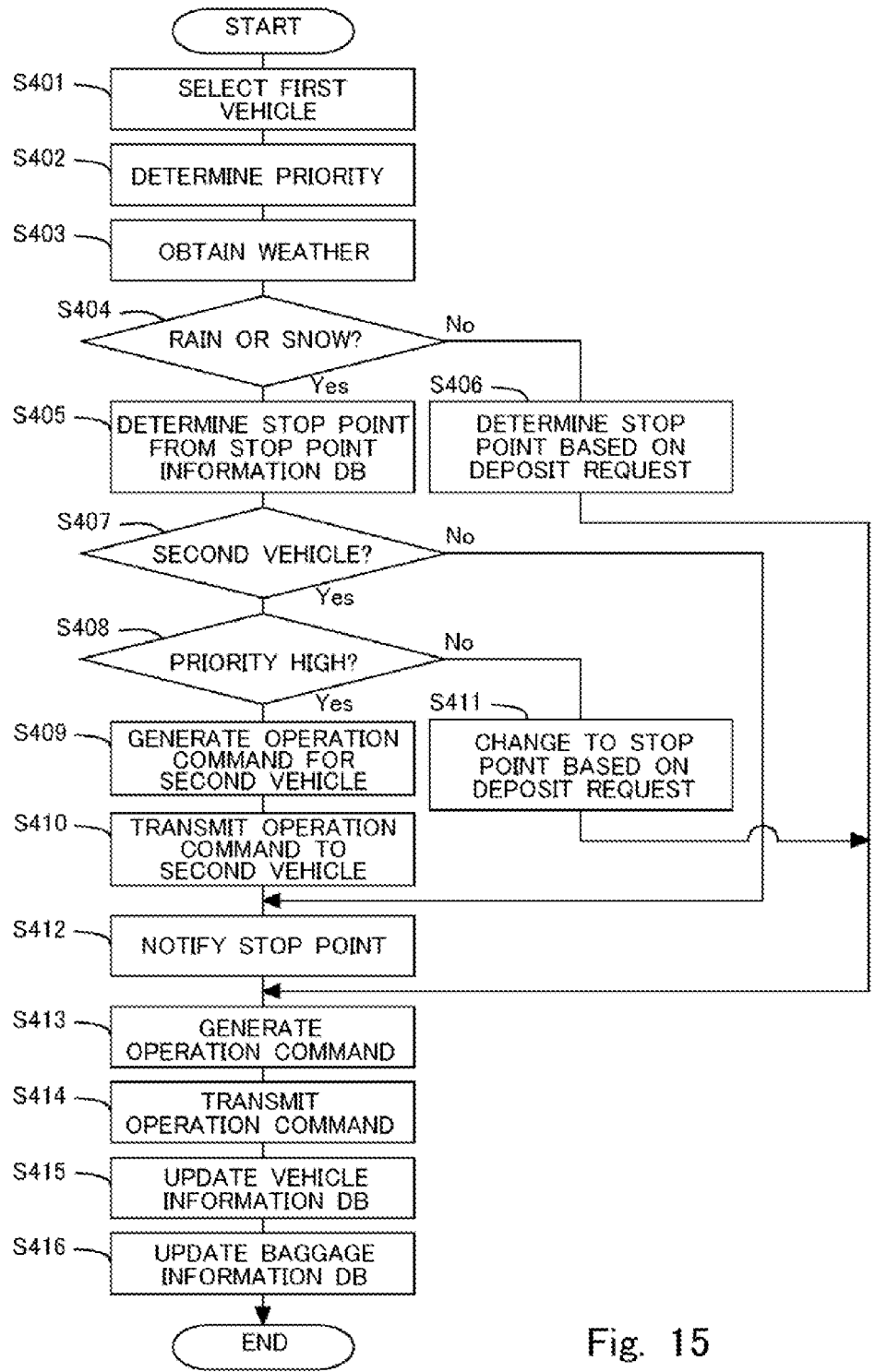
FIG. 15 is a flowchart of deposit processing according to the second embodiment.

Next, the deposit processing executed in step S102 of FIG. 10 will be described. FIG. 15 is a flowchart of the deposit processing according to the second embodiment. In step S401, the baggage management part 302 selects a vehicle 10 (first vehicle 10A) into which the baggage of the user is deposited. Based on the information included in the deposit request and the information stored in the baggage information DB 313, the baggage management part 302 selects a vehicle 10 that is able to move to the deposit point at the deposit date and time and that has one or more vacant (available) boxes 180. At this time, a box 180 for depositing the baggage is also selected. The vehicle 10 selected at this time is referred to as the first vehicle 10A.

In step S402, the baggage management part 302 determines the priority of the baggage. The priority of the baggage is determined based on the baggage attribute included in the deposit request. The relationship between the baggage attribute and the priority has been stored in advance in the auxiliary storage unit 33.

In step S403, the baggage management part 302 obtains the weather at the deposit point at the deposit date and time. The baggage management part 302 obtains information about the weather by accessing the server that provides the information about the weather.

In step S404, the baggage management part 302 determines whether or not the weather obtained is rain or snow. In this step, it is determined whether or not there is a possibility that the baggage gets wet. When an affirmative determination is made in step S404, the processing proceeds to step S405, whereas when a negative determination is made, the processing proceeds to step S406.

In step S405, the command part 303 determines the stop point of the first vehicle 10A based on the information stored in the stop point information DB 314. Here, the same processing as in step S204 is performed. On the other hand, in step S406, the command part 303 determines the deposit point included in the deposit request as the stop point of the first vehicle 10A.

In step S407, the command part 303 determines whether or not there is another vehicle 10 (second vehicle 10B) that stops at the same date and time at the stop point determined in step S405. Here, the command part 303 makes a determination based on the operation command for each vehicle 10. When an affirmative determination is made in step S407, the processing proceeds to step S408, whereas when a negative determination is made, the processing proceeds to step S412.

In step S408, the command part 303 determines whether or not the priority of the baggage to be deposited in the first vehicle 10A at the stop point is higher than the priority of the baggage to be deposited in or picked up from the second vehicle 10B at the stop point. This stop point is the stop point determined in step S405. When an affirmative determination is made in step S408, the processing proceeds to step S409, whereas when a negative determination is made, the processing proceeds to step S411.

In step S409, the command part 303 generates an operation command for the second vehicle 10B. That is, although a previous operation command has already been transmitted to the second vehicle 10B, the command part 303 generates the operation command to stop the second vehicle 10B at another location in order to allow the first vehicle 10A to stop at the location where the second vehicle 10B was scheduled to stop. For example, the command part 303 generates the operation command such that the second vehicle 10B stops at a point slightly away from the point with a roof. That is, the operation command is generated so that the second vehicle 10B does not stop at the point with a roof so as to allow the first vehicle 10A having a higher priority to stop at the point with a roof. Then, in step S410, the command part 303 transmits the operation command to the second vehicle 10B.

On the other hand, in step S411, the command part 303 changes the stop point so that the deposit point included in the deposit request is the stop point of the first vehicle 10A. In other words, the stop point determined in step S405 is changed.

In step S412, the command part 303 notifies the user terminal 20 of the stop point thus determined. This user terminal 20 is the terminal of the user who uses the first vehicle 10A. Here, note that even if the stop point of the second vehicle 10B is changed in step S409, the user who uses the second vehicle 10B is not notified because the second vehicle 10B will stop in the immediate vicinity of the original stop point. However, alternatively, the user terminal 20 of the user who uses the second vehicle 10B may be notified of the stop point thus changed.

In step S413, the command part 303 generates an operation command so that the first vehicle 10A departs from the current location and travels via the stop point at the deposit date and time. The operation command includes, for example, a route of the first vehicle 10A. In addition, the command part 303 generates an operation command so that the user terminal 20 is authenticated at the stop point to keep the baggage from the user. Then, in step S414, the command part 303 transmits the operation command to the first vehicle 10A. Further, in step S415, the command part 303 updates the vehicle information DB 312. That is, the route generated in step S413 is entered into the route field corresponding to the first vehicle 10A. Here, note that when the route of the second vehicle 10B is changed in step S409, a new route is also entered in the route field corresponding to the second vehicle 10B.

In step S416, the baggage management part 302 updates the baggage information DB 313. That is, the baggage information DB 313 is updated by entering information about each of the user ID, the baggage attribute, the deposit point, the deposit date and time, the weather at the deposit point, and the priority level into the baggage information DB 313.

Figure 16:
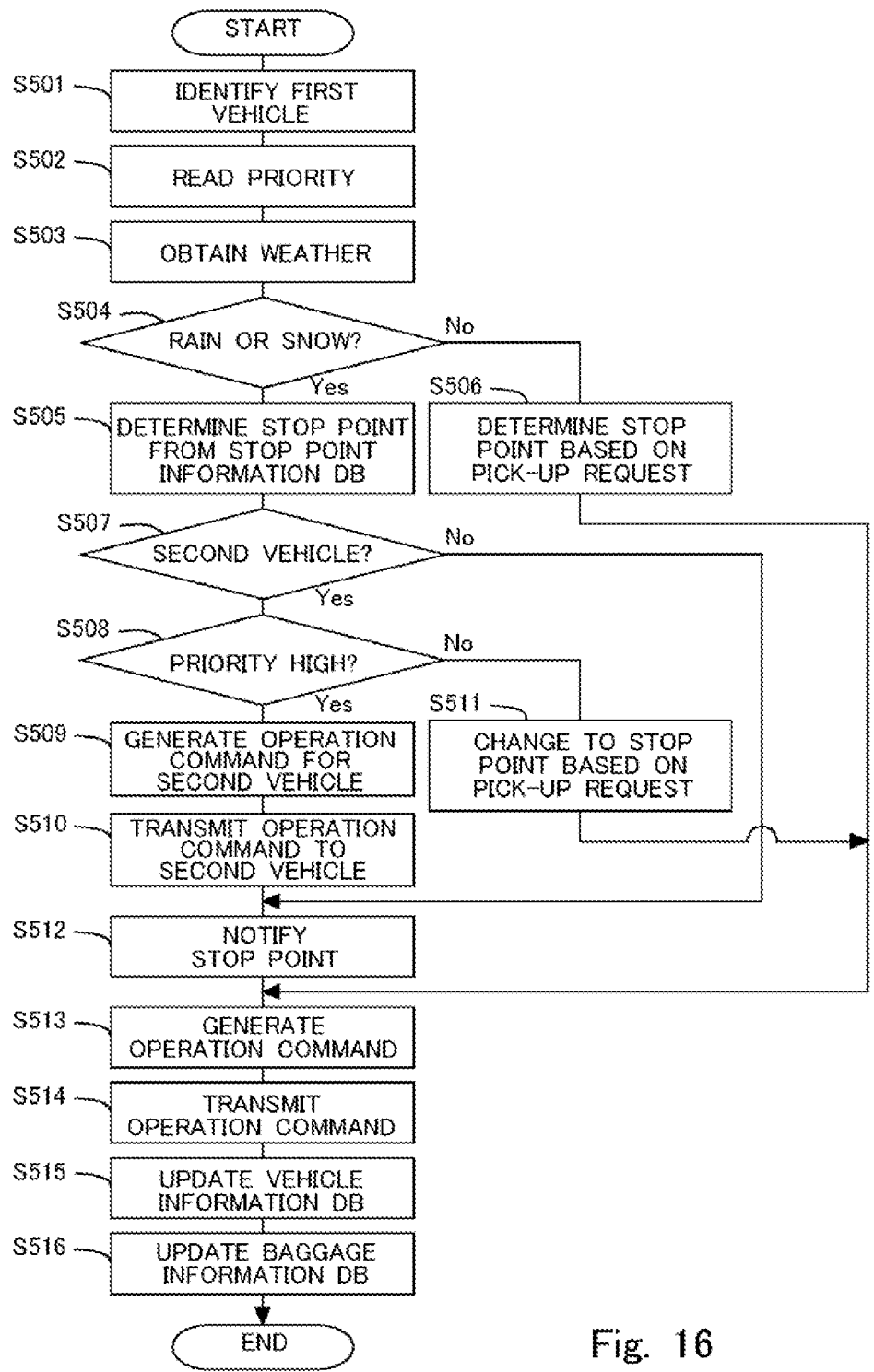
FIG. 16 is a flowchart of pick-up processing according to the second embodiment.

Next, the deposit processing executed in step S104 of FIG. 10 will be described. FIG. 16 is a flowchart of the pick-up processing according to the second embodiment. In step S501, the baggage management part 302 identifies the first vehicle 10A in which the baggage of the user has been deposited. The baggage management part 302 identifies the first vehicle 10A in which the baggage with the matching user ID is deposited, based on the information included in the pick-up request and the information stored in the baggage information DB 313.

In step S502, the baggage management part 302 reads the priority of the baggage. The priority of the baggage has been stored in the baggage information DB 313.

In step S503, the baggage management part 302 obtains the weather at the pick-up point at the pick-up date and time. The baggage management part 302 obtains information about the weather by accessing the server that provides the information about the weather.

In step S504, the baggage management part 302 determines whether or not the weather obtained is rain or snow. In this step, it is determined whether or not there is a possibility that the baggage gets wet. When an affirmative determination is made in step S504, the processing proceeds to step S505, whereas when a negative determination is made, the processing proceeds to step S506.

In step S505, the command part 303 determines the stop point of the first vehicle 10A based on the information stored in the stop point information DB 314. Here, the same processing as in step S304 is performed. On the other hand, in step S506, the command part 303 determines the pick-up point included in the pick-up request as the stop point of the first vehicle 10A.

In step S507, the command part 303 determines whether or not there is another vehicle 10 (second vehicle 10B) that stops at the same date and time at the stop point determined in step S505. Here, the command part 303 makes a determination based on the operation command of each vehicle 10. When an affirmative determination is made in step S507, the processing proceeds to step S508, whereas when a negative determination is made, the processing proceeds to step S512.

In step S508, the command part 303 determines whether or not the priority of the baggage to be picked up from the first vehicle 10A at the stop point is higher than the priority of the baggage to be deposited in or picked up from the second vehicle 10B at the stop point. This stop point is the stop point determined in step S505. When an affirmative determination is made in step S508, the processing proceeds to step S509, whereas when a negative determination is made, the processing proceeds to step S511.

In step S509, the command part 303 generates an operation command for the second vehicle 10B. For example, the command part 303 generates the operation command such that the second vehicle 10B stops at a point slightly away from the point with a roof. Then, in step S510, the command part 303 transmits the operation command to the second vehicle 10B.

On the other hand, in step S511, the command part 303 changes the stop point so that the pick-up point included in the pick-up request is the stop point of the first vehicle 10A. In other words, the stop point determined in step S505 is changed.

In step S512, the command part 303 notifies the user terminal 20 of the stop point thus determined. This user terminal 20 is the terminal of the user who uses the first vehicle 10A. Here, note that even if the stop point of the second vehicle 10B is changed in step S509, the user who uses the second vehicle 10B is not notified because the second vehicle 10B will stop in the immediate vicinity of the original stop point. However, alternatively, the user terminal 20 of the user who uses the second vehicle 10B may be notified of the stop point thus changed.

In step S513, the command part 303 generates an operation command so that the first vehicle 10A departs from the current location and travels via the stop point at the pick-up date and time. The operation command includes, for example, a route of the first vehicle 10A. In addition, the command part 303 generates the operation command so that the user terminal 20 is authenticated at the stop point to deliver the baggage to the user. Then, in step S514, the command part 303 transmits the operation command to the first vehicle 10A. Further, in step S515, the command part 303 updates the vehicle information DB 312. That is, the route generated in step S513 is entered into the route field corresponding to the first vehicle 10A. Here, note that when the route of the second vehicle 10B is changed in step S509, a new route is also entered in the route field corresponding to the second vehicle 10B.

In step S516, the baggage management part 302 updates the baggage information DB 313. That is, the baggage information DB 313 is updated by entering the information about the user ID, the pick-up point, the pick-up date and time, and the weather at the pick-up point into the baggage information DB 313.

As described above, according to the second embodiment, baggage having a high priority can be preferentially deposited or picked up in a place with a roof, thus making it possible to suppress wetting of the baggage that may cause a problem if it gets wet.

OTHER EMBODIMENTS

The above-described embodiments are merely examples, but the present disclosure can be implemented with appropriate modifications without departing from the spirit thereof.

The processing and/or means (devices, units, parts, etc.) described in the present disclosure can be freely combined and implemented as long as no technical contradiction occurs.

The processing described as being performed by one device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner. For example, the server 30 may include a part of the functions of the vehicle 10. Also, for example, the vehicle 10 may include a part or all of the functions of the server 30.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus comprising:
a communication circuit configured to communicate with a vehicle configured to drive autonomously with a storage device mounted thereon in which a user is able to deposit baggage, a terminal being carried by the user, and a server for managing weather information;
a storage medium having a vehicle information database in which vehicle information is to be stored, a baggage information database in which baggage information is to be stored, a stop point information database in which stop point information is stored and a map information database in which map information is stored, the vehicle information including a vehicle identifier identifying the vehicle, a current location of the vehicle associated with the vehicle identifier and a route of the vehicle associated with the vehicle identifier, the baggage information including the vehicle identifier, a user identifier identifying the user and being associated with the vehicle identifier, a deposit point at which the user deposits the baggage in the storage device, a deposit date and time when the user deposits the baggage in the storage device, a pick-up point at which the user picks up the baggage from the storage device and a pick-up date and time when the user picks up the baggage from the storage device, the stop point information including a location of a point with a roof where the vehicle can stop; and
a controller configured to control the vehicle and being further configured to:
receive the vehicle identifier of the vehicle and the current location of the vehicle via the communication circuit, wherein each of a plurality of vehicles periodically transmits its own vehicle identifier and current location to the information processing apparatus;
store, in the vehicle information database, the vehicle identifier and the current location as a part of the vehicle information;
receive a deposit request via the communication circuit, the deposit request being transmitted from a terminal being carried by a user and including the user identifier identifying the user, the deposit point at which the user wants to deposit a first baggage and the deposit day and time when the user wants to deposit the first baggage;
select, from among the plurality of vehicles, a first vehicle in which the first baggage is to be deposited based on the deposit request, the vehicle information and the baggage information, the first vehicle configured to move to the deposit point at the deposit day and time and having vacant of the storage device on the first vehicle;
receive weather at the deposit point at the deposit day and time via the communication circuit, the weather at the deposit point at the deposit day and time being transmitted from the server;
determine whether or not the weather at the deposit point at the deposit day and time is rain or snow;
when the weather at the deposit point at the deposit day and time is rain or snow, determine a deposit dispatch point of the first baggage based on the deposit request and the stop point information, the deposit dispatch point being a point with the roof closest to the deposit point;
when the weather at the deposit point at the deposit day and time is rain or snow, transmit the deposit dispatch point to the terminal via the communication circuit;
when the weather at the deposit point at the deposit day and time is neither rain nor snow, determine a deposit dispatch point of the first baggage based on the first deposit request, the deposit dispatch point being the deposit point;
generate a deposit operation command based on the vehicle information, the stop point information and the map information, the deposit operation command including a deposit route which the first vehicle departs from the current location of the first vehicle and travels via the deposit dispatch point at the deposit day and time;
transmit the deposit operation command to the first vehicle via the communication circuit to move the first vehicle autonomously along the deposit route;
associate the deposit route with the vehicle identifier and store, in the vehicle information database, the first deposit route associated with the vehicle identifier as a part of the vehicle information;
associate the user identifier, the deposit point and the deposit day and time with the vehicle identifier and store, in the baggage information database, the first user identifier, the deposit point and the deposit day and time associated with the vehicle identifier as a part of the baggage information;
after the user identifier, the deposit point and the deposit day and time associated with the vehicle identifier are stored in the baggage information database, receive a pick-up request via the communication circuit, the pick-up request being transmitted from the terminal and including the first user identifier, the pick-up point at which the user wants to pick up the first baggage and the pick-up day and time when the user wants to pick up the first baggage;

specify the first vehicle in which the user has already deposited the first baggage by specifying the user identifier in the baggage information that is the same as the user identifier in the pick-up request and specifying the vehicle identifier in the baggage information that corresponds to the user identifier in the baggage information based on the pick-up request and the baggage information;

receive weather at the pick-up point at the pick-up day and time via the communication circuit, the weather at the pick-up point at the pick-up day and time being transmitted from the server;

determine whether or not the weather at the pick-up point at the pick-up day and time is rain or snow;

when the weather at the pick-up point at the pick-up day and time is rain or snow, determine a pick-up dispatch point of the first baggage based on the pick-up request and the stop point information, the pick-up dispatch point being a point with the roof closest to the pick-up point;

when the weather at the pick-up point at the pick-up day and time is rain or snow, transmit the pick-up dispatch point to the terminal via the communication circuit;

when the weather at the pick-up point at the pick-up day and time is neither rain nor snow, determine a pick-up dispatch point of the first baggage based on the pick-up request, the pick-up dispatch point being the pick-up point;

generate a pick-up operation command based on the vehicle information, the stop point information and the map information, the pick-up operation command including a pick-up route which the first vehicle departs from the current location of the first vehicle and travels via the pick-up dispatch point at the pick-up day and time;

transmit the pick-up operation command to the first vehicle via the communication circuit to move the first vehicle autonomously along the deposit route;

associate the pick-up route with the vehicle identifier and store, in the vehicle information database, the pick-up route associated with the vehicle identifier as a part of the vehicle information;

associate the user identifier, the pick-up point and the pick-up day and time with the vehicle identifier and store, in the baggage information database, the user identifier, the pick-up point and the pick-up day and time associated with the vehicle identifier as a part of the baggage information;

after the user identifier, the deposit point, the deposit day and time, the pick-up point and the pick-up day and time associated with the vehicle identifier are stored in the baggage information database, receive pick-up completion information of the first baggage via the communication circuit, the pick-up completion information being transmitted from the first vehicle and including the vehicle identifier; and reset the user identifier, the deposit point, the deposit day and time, the pick-up point and the pick-up day and time in the baggage information that correspond to the vehicle identifier in the baggage information that is the same as the vehicle identifier in the pick-up completion information.

2. The information processing apparatus according to claim 1, wherein the location of the point with the roof in the stop point information is a position of a bus or taxi stop, the stop point information further includes a time zone when buses or taxis do not stop at the bus or taxi stop, and the controller is configured to:

determine, when the weather at the deposit point at the deposit day and time is rain or snow based on the position of the bus or taxi stop and the time zone when buses or taxis do not stop at the bus or taxi stop, the position of the bus or taxi stop in the time zone when the buses or taxis do not stop as the deposit dispatch point; and determine, when the weather at the pick-up point at the pick-up day and time is rain or snow, based on the position of the bus or taxi stop and the time zone when buses or taxis do not stop at the bus or taxi stop, the position of the bus or taxi stop in the time zone when the buses or taxis do not stop as the pick-up dispatch point.

3. The information processing apparatus according to claim 1, wherein the baggage information further includes an attribute of the baggage associated with the vehicle identifier and a priority of the baggage associated with the vehicle identifier, and the controller is further configured to:

after selecting the first vehicle, determine a first priority of the first baggage based on the attribute of the first baggage;

when the weather at the deposit point at the deposit day and time is rain or snow, determine whether or not there is a second vehicle other than the first vehicle in the plurality of vehicles based on the route included in the vehicle information, the second vehicle stopping at the same point as the deposit dispatch point at the same day and time as the deposit day and time;

when there is the second vehicle, determine whether or not the first priority of the first baggage to be deposited in the first vehicle at the deposit dispatch point is higher than a second priority of a second baggage to be deposited in or picked up from the second vehicle at a second dispatch point that is the same point as the deposit dispatch point based on the baggage information;

when the first priority is higher than the second priority, keep the deposit dispatch point of the first vehicle that is the point with the roof closest to the deposit point and change the second dispatch point of the second vehicle;

when the first priority is lower than the second priority, change the deposit dispatch point of the first vehicle that is the point with the roof closest to the deposit point to the first deposit point and keep the second dispatch point of the second vehicle;

associate the attribute and the first priority with the vehicle identifier and store, in the baggage information database, the attribute and the first priority associated with the vehicle identifier as a part of the baggage information;

after specifying the first vehicle, reads the first priority corresponding to the vehicle identifier from the baggage information database;

when the weather at the pick-up point at the pick-up day and time is rain or snow, determine whether or not there is a second vehicle other than the first vehicle in the plurality of vehicles based on the route included in the vehicle information, the second vehicle stopping at the same point as the pick-up dispatch point at the same day and time as the first pick-up day and time;

when there is the second vehicle, determine whether or not the first priority of the first baggage to be picked up from the first vehicle at the pick-up dispatch point is higher than a third priority of a third baggage to be deposited in or picked up from the second vehicle at a third dispatch point that is the same point as the pick-up dispatch point based on the baggage information;

when the first priority is higher than the third priority, keep the pick-up dispatch point of the first vehicle that is the point with the roof closest to the pick-up point and change the third dispatch point of the second vehicle; and when the first priority is lower than the third priority, change the pick-up dispatch point of the first vehicle that is the point with the roof closest to the pick-up point to the pick-up point and keep the third dispatch point of the second vehicle.

4. The information processing apparatus according to claim 3, wherein
the controller is configured to determine the priority so that the baggage that causes a problem when wet with rain has a higher priority than the baggage that does not cause a problem even if wet with rain.

5. An information processing method for controlling, by means of a computer, a vehicle configured to drive autonomously, the vehicle having a storage device mounted thereon in which a user is able to deposit baggage, wherein
the computer comprises:
a communication circuit configured to communicate with the vehicle, a terminal being carried by the user, and a server for managing weather information; and
a storage medium having a vehicle information database in which vehicle information is to be stored, a baggage information database in which baggage information is to be stored, a stop point information database in which stop point information is stored and a map information database in which map information is stored, the vehicle information including a vehicle identifier identifying the vehicle, a current location of the vehicle associated with the vehicle identifier and a route of the vehicle associated with the vehicle identifier, the baggage information including the vehicle identifier, a user identifier identifying the user and being associated with the vehicle identifier, a deposit point at which the user deposits the baggage in the storage device, a deposit date and time when the user deposits the baggage in the storage device, a pick-up point at which the user picks up the baggage from the storage device and a pick-up date and time when the user picks up the baggage from the storage device, the stop point information including a location of a point with a roof where the vehicle can stop, and
the information processing method comprises:
receiving the vehicle identifier of the vehicle and the current location of the vehicle via the communication circuit, wherein each of a plurality of vehicles periodically transmits its own vehicle identifier and current location to the computer:

storing, in the vehicle information database, the vehicle identifier and the current location as a part of the vehicle information;

receiving a deposit request via the communication circuit, the deposit request being transmitted from a terminal being carried by a user and including the user identifier identifying the user, the deposit point at which the user wants to deposit a first baggage and the deposit day and time when the user wants to deposit the first baggage;

selecting, from among the plurality of vehicles, a first vehicle in which the first baggage is to be deposited based on the deposit request, the vehicle information and the baggage information, the first vehicle configured to move to the deposit point at the deposit day and time and having vacant of the storage device on the first vehicle:

receiving weather at the deposit point at the deposit day and time via the communication circuit, the weather at the deposit point at the deposit day and time being transmitted from the server;

determining whether or not the weather at the deposit point at the deposit day and time is rain or snow;

when the weather at the deposit point at the deposit day and time is rain or snow, determining a deposit dispatch point of the first baggage based on the deposit request and the stop point information, the deposit dispatch point being a point with the roof closest to the deposit point;

when the weather at the deposit point at the deposit day and time is rain or snow, transmitting the deposit dispatch point to the terminal via the communication circuit;

when the weather at the deposit point at the deposit day and time is neither rain nor snow, determining a deposit dispatch point of the first baggage based on the deposit request, the deposit dispatch point being the deposit point;

generating a deposit operation command based on the vehicle information, the stop point information and the map information, the deposit operation command including a deposit route which the first vehicle departs from the current location of the first vehicle and travels via the first deposit dispatch point at the deposit day and time;

transmitting the deposit operation command to the first vehicle via the communication circuit to move the first vehicle autonomously along the deposit route;

associating the deposit route with the vehicle identifier and storing, in the vehicle information database, the deposit route associated with the vehicle identifier as a part of the vehicle information;

associating the user identifier, the deposit point and the deposit day and time with the vehicle identifier and storing, in the baggage information database, the user identifier, the deposit point and the deposit day and time associated with the vehicle identifier as a part of the baggage information;

after the user identifier, the deposit point and the deposit day and time associated with the vehicle identifier are stored in the baggage information database, receiving a pick-up request via the communication circuit, the pick-up request being transmitted from the terminal and including the user identifier, the pick-up point at which the user wants to pick up the first baggage and the pick-up day and time when the user wants to pick up the first baggage;

specifying the first vehicle in which the user has already deposited the first baggage by specifying the user identifier in the baggage information that is the same as the user identifier in the pick-up request and specifying the vehicle identifier in the baggage information that corresponds to the user identifier in the baggage information based on the pick-up request and the baggage information;

receiving weather at the pick-up point at the pick-up day and time via the communication circuit, the weather at the pick-up point at the pick-up day and time being transmitted from the server;

determining whether or not the weather at the pick-up point at the pick-up day and time is rain or snow;

when the weather at the pick-up point at the pick-up day and time is rain or snow, determining a pick-up dispatch point of the first baggage based on the pick-up request and the stop point information, the first pick-up dispatch point being a point with the roof closest to the pick-up point;

when the weather at the pick-up point at the pick-up day and time is rain or snow, transmitting the pick-up dispatch point to the terminal via the communication circuit;

when the weather at the pick-up point at the pick-up day and time is neither rain nor snow, determining a pick-up dispatch point of the first baggage based on the pick-up request, the pick-up dispatch point being the pick-up point;

generating a pick-up operation command based on the vehicle information, the stop point information and the map information, the pick-up operation command including a pick-up route which the first vehicle departs from the current location of the first vehicle and travels via the pick-up dispatch point at the pick-up day and time;

transmitting the pick-up operation command to the first vehicle via the communication circuit to move the first vehicle autonomously along the deposit route;

associating the pick-up route with the vehicle identifier and storing, in the vehicle information database, the pick-up route associated with the vehicle identifier as a part of the vehicle information;

associating the user identifier, the pick-up point and the pick-up day and time with the vehicle identifier and storing, in the baggage information database, the first user identifier, the pick-up point and the pick-up day and time associated with the vehicle identifier as a part of the baggage information;

after the user identifier, the deposit point, the deposit day and time, the pick-up point and the pick-up day and time associated with the vehicle identifier are stored in the baggage information database, receiving pick-up completion information of the first baggage via the communication circuit, the pick-up completion information being transmitted from the first vehicle and including the vehicle identifier; and resetting the user identifier, the deposit point, the deposit day and time, the pick-up point and the pick-up day and time in the baggage information that correspond to the vehicle identifier in the baggage information that is the same as the vehicle identifier in the pick-up completion information.

6. The information processing method according to claim 5, wherein the location of the point with the roof in the stop point information is a position of a bus or taxi stop, the stop point information further includes a time zone when buses or taxis do not stop at the bus or taxi stop, and the information processing method comprises:
determining, when the weather at the deposit point at the deposit day and time is rain or snow, based on the position of the bus or taxi stop and the time zone when buses or taxis do not stop at the bus or taxi stop, the position of the bus or taxi stop in the time zone when the buses or taxis do not stop as the deposit dispatch point; and determining, when the weather at the pick-up point at the pick-up day and time is rain or snow, based on the position of the bus or taxi stop and the time zone when buses or taxis do not stop at the bus or taxi stop, the position of the bus or taxi stop in the time zone when the buses or taxis do not stop as the pick-up dispatch point.

7. The information processing method according to claim 5, wherein the baggage information further includes an attribute of the baggage associated with the vehicle identifier and a priority of the baggage associated with the vehicle identifier, and the information processing method further comprises:
after selecting the first vehicle, determining a first priority of the first baggage based on the attribute of the first baggage;

when the weather at the deposit point at the deposit day and time is rain or snow, determining whether or not there is a second vehicle other than the first vehicle in the plurality of vehicles based on the route included in the vehicle information, the second vehicle stopping at the same point as the deposit dispatch point at the same day and time as the deposit day and time;

when there is the second vehicle, determining whether or not the first priority of the first baggage to be deposited in the first vehicle at the deposit dispatch point is higher than a second priority of a second baggage to be deposited in or picked up from the second vehicle at a second dispatch point that is the same point as the deposit dispatch point based on the baggage information;

when the first priority is higher than the second priority, keeping the deposit dispatch point of the first vehicle that is the point with the roof closest to the deposit point and changing the second dispatch point of the second vehicle;

when the first priority is lower than the second priority, changing the deposit dispatch point of the first vehicle that is the point with the roof closest to the deposit point to the first deposit point and keeping the second dispatch point of the second vehicle;

associating the attribute and the first priority with the vehicle identifier and store, in the baggage information database, the attribute and the first priority associated with the vehicle identifier as a part of the baggage information;

after specifying the first vehicle, reading the first priority corresponding to the vehicle identifier from the baggage information database;

when the weather at the pick-up point at the pick-up day and time is rain or snow, determining whether or not there is a second vehicle other than the first vehicle in the plurality of vehicles based on the route included in the vehicle information, the second vehicle stopping at the same point as the pick-up dispatch point at the same day and time as the first pick-up day and time;

when there is the second vehicle, determining whether or not the first priority of the first baggage to be picked up from the first vehicle at the pick-up dispatch point is higher than a third priority of a third baggage to be deposited in or picked up from the second vehicle at a third dispatch point that is the same point as the pick-up dispatch point based on the baggage information;

when the first priority is higher than the third priority, keeping the pick-up dispatch point of the first vehicle that is the point with the roof closest to the pick-up point and changing the third dispatch point of the second vehicle; and when the first priority is lower than the third priority, changing the pick-up dispatch point of the first vehicle that is the point with the roof closest to the pick-up point to the pick-up point and keeping the third dispatch point of the second vehicle.

8. The information processing method according to claim 7, wherein the computer is configured to determine the priority so that the baggage that causes a problem when wet with rain has a higher priority than the baggage that does not cause a problem even if wet with rain.

9. A non-transitory storage medium storing a program for causing a computer to control a vehicle configured to drive autonomously, the vehicle having a storage device mounted thereon in which a user is able to deposit baggage, wherein the computer comprises:

a communication circuit configured to communicate with the vehicle, a terminal being carried by the user, and a server for managing weather information; and a storage medium having a vehicle information database in which vehicle information is to be stored, a baggage information database in which baggage information is to be stored, a stop point information database in which stop point information is stored and a map information database in which map information is stored, the vehicle information including a vehicle identifier identifying the vehicle, a current location of the vehicle associated with the vehicle identifier and a route of the vehicle associated with the vehicle identifier, the baggage information including the vehicle identifier, a user identifier identifying the user and being associated with the vehicle identifier, a deposit point at which the user deposits the baggage in the storage device, a deposit date and time when the user deposits the baggage in the storage device, a pick-up point at which the user picks up the baggage from the storage device and a pick-up date and time when the user picks up the baggage from the storage device, the stop point information including a location of a point with a roof where the vehicle can stop, and the program causes the computer to:

receive the vehicle identifier of the vehicle and the current location of the vehicle via the communication circuit, wherein each of a plurality of vehicles periodically transmits its own vehicle identifier and current location to the computer;

store, in the vehicle information database, the vehicle identifier and the current location as a part of the vehicle information;

receive a deposit request via the communication circuit, the deposit request being transmitted from a terminal being carried by a user and including the user identifier identifying the user, the deposit point at which the user wants to deposit a first baggage and the deposit day and time when the user wants to deposit the first baggage;

select, from among the plurality of vehicles, a first vehicle in which the first baggage is to be deposited based on the deposit request, the vehicle information and the baggage information, the first vehicle configured to move to the deposit point at the deposit day and time and having vacant of the storage device on the first vehicle;

receive weather at the deposit point at the deposit day and time via the communication circuit, the weather at the deposit point at the deposit day and time being transmitted from the server;

determine whether or not the weather at the deposit point at the deposit day and time is rain or snow;

when the weather at the deposit point at the deposit day and time is rain or snow, determine a deposit dispatch point of the first baggage based on the deposit request and the stop point information, the deposit dispatch point being a point with the roof closest to the deposit point;

when the weather at the deposit point at the deposit day and time is rain or snow, transmit the deposit dispatch point to the terminal via the communication circuit;

when the weather at the deposit point at the deposit day and time is neither rain nor snow, determine a deposit dispatch point of the first baggage based on the deposit request, the deposit dispatch point being the deposit point;

generate a deposit operation command based on the vehicle information, the stop point information and the map information, the deposit operation command including a deposit route which the first vehicle departs from the current location of the first vehicle and travels via the deposit dispatch point at the deposit day and time;

transmit the deposit operation command to the first vehicle via the communication circuit to move the first vehicle autonomously along the deposit route;

associate the deposit route with the vehicle identifier and store, in the vehicle information database, the deposit route associated with the vehicle identifier as a part of the vehicle information;

associate the user identifier, the deposit point and the deposit day and time with the vehicle identifier and store, in the baggage information database, the user identifier, the deposit point and the deposit day and time associated with the vehicle identifier as a part of the baggage information;

after the user identifier, the deposit point and the deposit day and time associated with the vehicle identifier are stored in the baggage information database, receive a pick-up request via the communication circuit, the pick-up request being transmitted from the terminal and including the user identifier, the pick-up point at which the user wants to pick up the first baggage and the pick-up day and time when the user wants to pick up the first baggage;

specify the first vehicle in which the first user has already deposited the first baggage by specifying the user identifier in the baggage information that is the same as the user identifier in the pick-up request and specifying the vehicle identifier in the baggage information that corresponds to the user identifier in the baggage information based on the pick-up request and the baggage information;

receive weather at the pick-up point at the pick-up day and time via the communication circuit, the weather at the pick-up point at the pick-up day and time being transmitted from the server;

determine whether or not the weather at the pick-up point at the pick-up day and time is rain or snow;

when the weather at the pick-up point at the pick-up day and time is rain or snow, determine a pick-up dispatch point of the first baggage based on the pick-up request and the stop point information, the pick-up dispatch point being a point with the roof closest to the pick-up point;

when the weather at the pick-up point at the pick-up day and time is rain or snow, transmit the pick-up dispatch point to the terminal via the communication circuit;

when the weather at the pick-up point at the pick-up day and time is neither rain nor snow, determine a pick-up dispatch point of the first baggage based on the pick-up request, the pick-up dispatch point being the pick-up point;

generate a pick-up operation command based on the vehicle information, the stop point information and the map information, the pick-up operation command including a pick-up route which the first vehicle departs from the current location of the first vehicle and travels via the pick-up dispatch point at the pick-up day and time;

transmit the pick-up operation command to the first vehicle via the communication circuit to move the first vehicle autonomously along the deposit route;

associate the pick-up route with the vehicle identifier and store, in the vehicle information database, the pick-up route associated with the vehicle identifier as a part of the vehicle information;

associate the user identifier, the pick-up point and the first pick-up day and time with the vehicle identifier and store, in the baggage information database, the user identifier, the pick-up point and the pick-up day and time associated with the vehicle identifier as a part of the baggage information;

after the user identifier, the deposit point, the deposit day and time, the pick-up point and the first pick-up day and time associated with the vehicle identifier are stored in the baggage information database, receive pick-up completion information of the first baggage via the communication circuit, the pick-up completion information being transmitted from the first vehicle and including the vehicle identifier; and reset the user identifier, the deposit point, the deposit day and time, the pick-up point and the pick-up day and time in the baggage information that correspond to the vehicle identifier in the baggage information that is the same as the vehicle identifier in the pick-up completion information.

* * * * *